United States Patent
Ibrahim et al.

(10) Patent No.: US 11,723,028 B2
(45) Date of Patent: Aug. 8, 2023

(54) CORESET AND SEARCH SPACE ASSOCIATION WITH RESOURCE BANDWIDTH

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/324,454

(22) Filed: May 19, 2021

(65) Prior Publication Data

US 2021/0400654 A1 Dec. 23, 2021

Related U.S. Application Data

(60) Provisional application No. 63/040,957, filed on Jun. 18, 2020, provisional application No. 63/040,992, filed on Jun. 18, 2020.

(51) Int. Cl.
*H04W 74/02* (2009.01)
*H04L 5/00* (2006.01)
(Continued)

(52) U.S. Cl.
CPC ............. *H04W 72/20* (2023.01); *H04L 5/14* (2013.01); *H04W 72/0446* (2013.01)

(58) Field of Classification Search
CPC .......... H04W 72/0406; H04W 72/0446; H04L 5/14; H04L 5/0044; H04L 5/0053; H04L 5/0041

See application file for complete search history.

(56) References Cited

U.S. PATENT DOCUMENTS 11,432,365 B2 * 8/2022 Takeda .................. H04L 5/0053
2021/0345454 A1 * 11/2021 Dhanapal .......... H04W 28/0268
(Continued)

FOREIGN PATENT DOCUMENTS

WO   2019225970 A1   11/2019
WO   2020068251 A1   4/2020
(Continued)

OTHER PUBLICATIONS

International Search Report and Written Opinion—PCT/US2021/033477—ISA/EPO—dated Sep. 28, 2021.

*Primary Examiner* — Diane L Lo
*Assistant Examiner* — Abusayeed M Haque
(74) *Attorney, Agent, or Firm* — Procopio, Cory, Hargreaves & Savitch LLP

(57) ABSTRACT

A user equipment (UE) communicates with a base station operating in a sub-band frequency division duplexing (FDD) mode. The UE receives a downlink transmission in a usable bandwidth (BW) of an active downlink bandwidth part (BWP) in a sub-band full duplex (SBFD) slot, where the usable BW does not include frequency resources used for guard band and uplink transmission. The UE monitors for one or more control resource set (CORESET) configured by the base station within the active downlink BWP during monitoring occasions.

28 Claims, 27 Drawing Sheets

(51) Int. Cl.
*H04W 72/20* (2023.01)
*H04W 72/0446* (2023.01)
*H04L 5/14* (2006.01)

(56) References Cited

U.S. PATENT DOCUMENTS

| | | | | |
|---|---|---|---|---|
| 2021/0360664 | A1* | 11/2021 | Fakoorian | H04L 1/0004 |
| 2021/0400654 | A1* | 12/2021 | Ibrahim | H04L 5/0053 |
| 2022/0022209 | A1* | 1/2022 | Abotabl | H04W 72/0453 |
| 2022/0078718 | A1* | 3/2022 | Hoshino | H04W 72/02 |
| 2022/0141857 | A1* | 5/2022 | Lee | H04W 72/23 |
| | | | | 370/329 |
| 2022/0159659 | A1* | 5/2022 | Hosseini | H04W 72/23 |
| 2022/0201725 | A1* | 6/2022 | Liu | H04L 1/1812 |

FOREIGN PATENT DOCUMENTS

| | | | | |
|---|---|---|---|---|
| WO | WO-2020068251 | A1 * | 4/2020 | H04W 72/042 |
| WO | WO-2020075775 | * | 4/2020 | H04W 16/28 |
| WO | WO-2020222458 | A1 * | 11/2020 | H04B 1/525 |

* cited by examiner

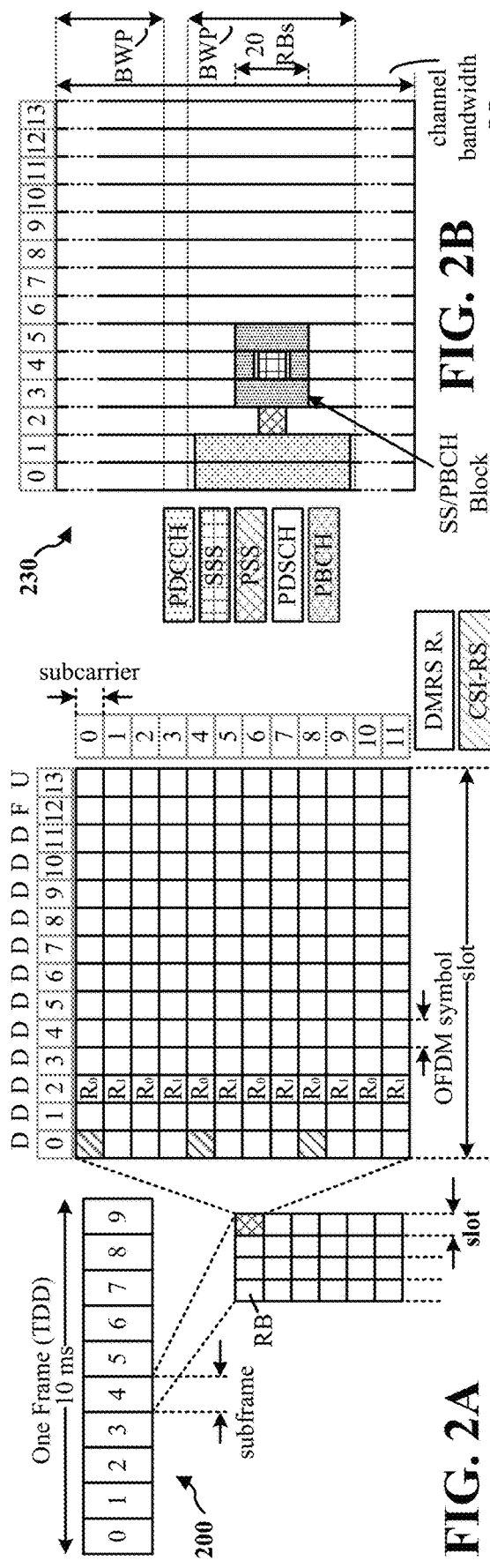
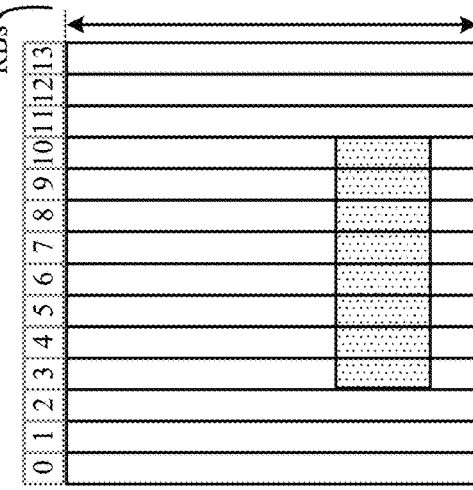
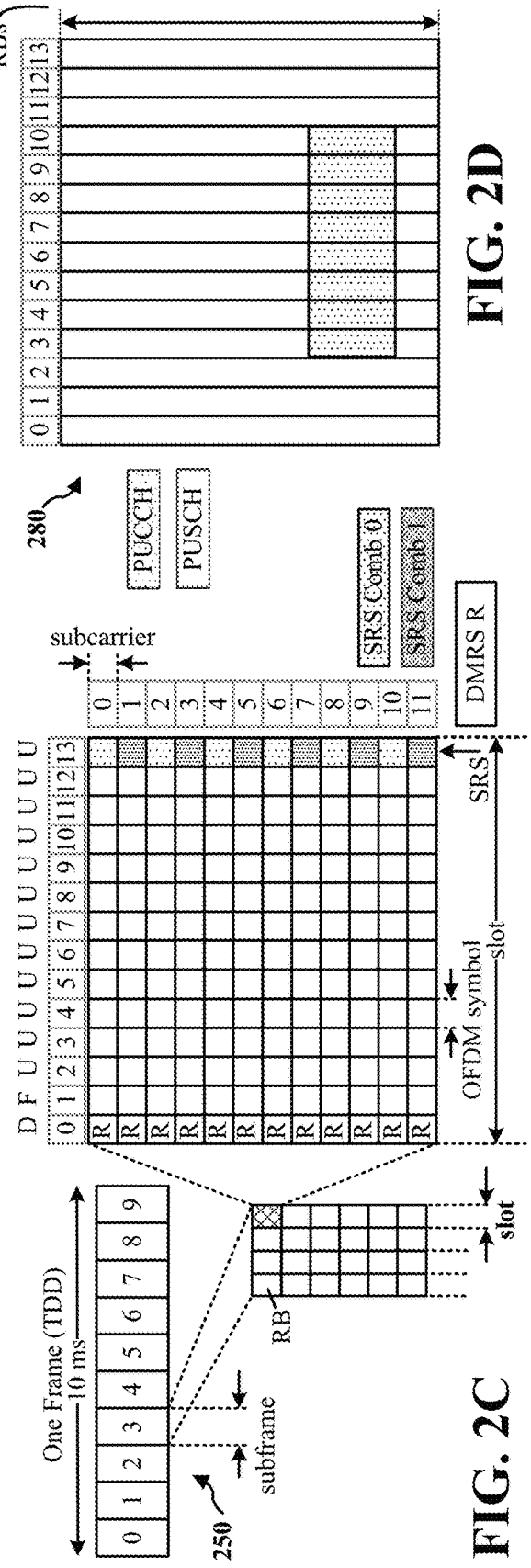
FIG. 2A
FIG. 2B
FIG. 2C
FIG. 2D

CORESET AND SEARCH SPACE ASSOCIATION WITH RESOURCE BANDWIDTH

CROSS REFERENCE TO RELATED APPLICATION(S)

This application claims the benefit of U.S. Provisional Application Ser. No. 63/040,992 entitled "CORESET AND SEARCH SPACE ASSOCIATION WITH RESOURCE BANDWIDTH" and filed on Jun. 18, 2020, and the benefit of U.S. Provisional Application Ser. No. 63/040,957 entitled "CORESET AND SEARCH SPACE ENHANCEMENTS FOR USABLE BANDWIDTH OF A BANDWIDTH PART IN SUB-BAND FULL-DUPLEX" and filed on Jun. 18, 2020, each of which is expressly incorporated by reference herein in its entirety.

TECHNICAL FIELD

The present disclosure relates generally to communication systems, and more particularly, to control transmissions for a resource bandwidth.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may communicate with a base station operating in a sub-band frequency division duplexing (FDD) mode. The apparatus may receive downlink transmissions within one or more resource bandwidths (RBWs) of an active bandwidth part (BWP). The apparatus monitors for a control transmission from the base station within the one or more RBWs of the active BWP.

In an aspect of the disclosure, a method, a computer-readable medium, and an apparatus are provided for wireless communication at a base station. The apparatus may communicate with a UE in a sub-band FDD mode. The apparatus transmits a downlink transmission in one or more RBWs of an active BWP. The apparatus may configure the UE to monitor for a control transmission from the base station within the one or more RBWs of the active BWP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively according to some aspects.

DETAILED DESCRIPTION

Figure 1:
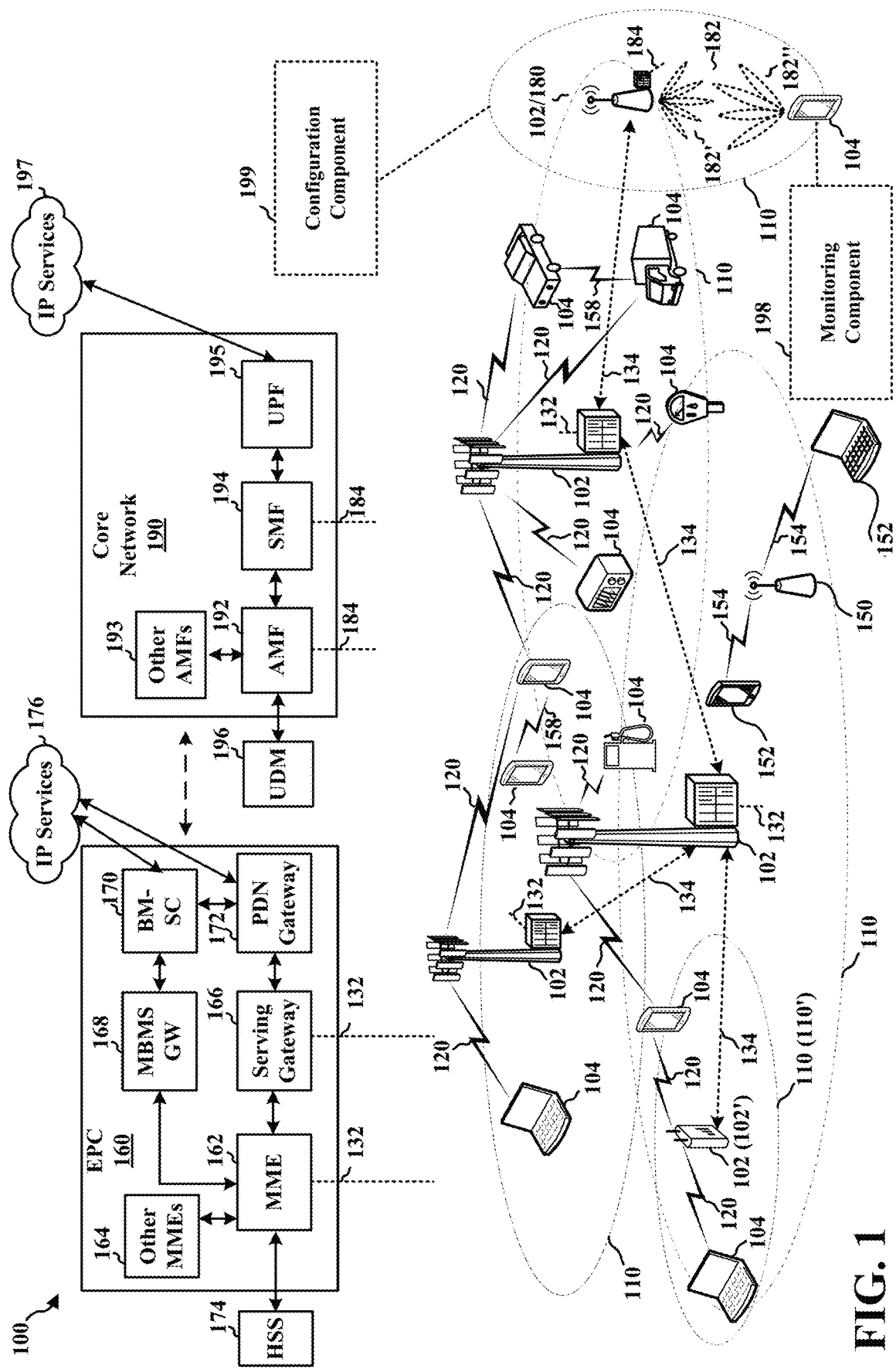
FIG. 1 is a diagram illustrating an example of a wireless communications system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a Monitoring Component 198 configured to monitor for CORESET and SS configured by a base station under half-duplex operation or full-duplex operation, where the Monitoring Component 198 may monitor for a control transmission from the base station within the one or more RBWs of the active BWP apply a different CORESET monitoring rule based on whether the base station is operating under the full-duplex mode and based on a configuration transmitted by the base station. In certain aspects, the base station may include a Configuration Component 199 configured to communicate with the UE 104 in a sub-band FDD mode. For example, the Configuration Component 199 may transmit a downlink transmission in one or more RBWs of an active BWP. The Configuration Component 199 may configure the UE to monitor for a control transmission within the one or more RBWs of the active BWP.

In certain aspects, the Monitoring Component 198 may be configured to monitor for CORESET and SS configured by a base station under half-duplex operation and full-duplex operation, where the Monitoring Component 198 may apply a different CORESET monitoring rule based on whether the base station is operating under the full-duplex mode. In certain aspects, the base station may include a Configuration Component 199 configured to communicate with the UE 104 in a sub-band FDD mode using SBFD slots. For example, the Configuration Component 199 may transmit a downlink transmission in a usable BW of an active downlink BWP in an SBFD slot, where the usable BW does not include frequency resources used for guard band and uplink transmission. The Configuration Component 199 may configure the UE to monitor for one or more CORESET within the active downlink BWP.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$<br>[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
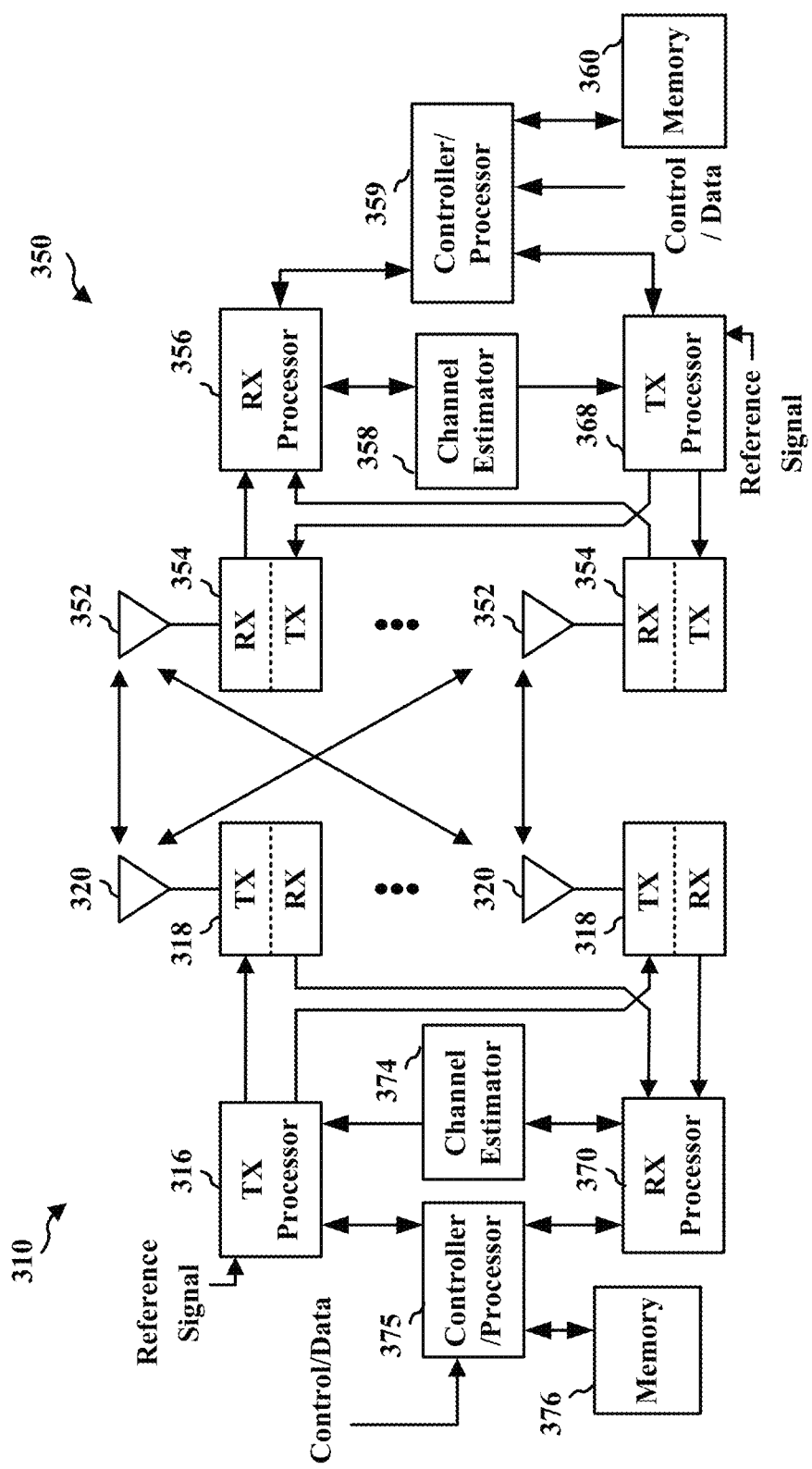
FIG. 3 is a diagram illustrating an example of a base station and user equipment (UE) in an access network according to some aspects.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A communication network, such as a communication network based on 5G NR, may support full-duplex operation in addition to half-duplex operation. Full-duplex operation may effectively increase the capacity of the communication network. Base stations and UEs in the communication network may support full-duplex operation separately. For example, a base station in the communication network may support full-duplex operation while one or more UEs in the communication network may support half-duplex operation without supporting full-duplex operation. In another example, a base station in the communication network may support full-duplex operation and one or more UEs in the communication network may also support full-duplex operation. In another example, a base station in the communication network may support half-duplex operation without supporting full-duplex operation whereas one or more UEs in the communication network may support full-duplex operation.

Regardless of whether the base stations and UEs in the communication network individually support full-duplex operation, interference may be an issue for full-duplex operation. As illustrated in diagram 400 in FIG. 4A, two base stations 404A and 404B operating in full-duplex mode and two UEs, UE1 402A and UE2 402B, operating in half-duplex mode are shown in the depicted example. While the base station 404A may be simultaneously transmitting downlink data to the UE1 402A and receiving uplink data from the UE2 402B, self-inference between the uplink reception and the downlink transmission at the base station 404A may occur. For example, a receiver at the base station may receive the transmitted downlink signal as interference to the uplink signal from the UE2 402B. In addition, because the UE1 402A may be receiving downlink data and the UE2 402B may be simultaneously transmitting uplink data, the transmission from UE2 402B may cause interference to the downlink signal being received by the UE1 402A. Moreover, because the base station 404B may also be receiving uplink data from the UE2 402B and transmitting downlink data to the UE1 402A, interference between the base stations 404A and 404B may occur.

Figure 4:
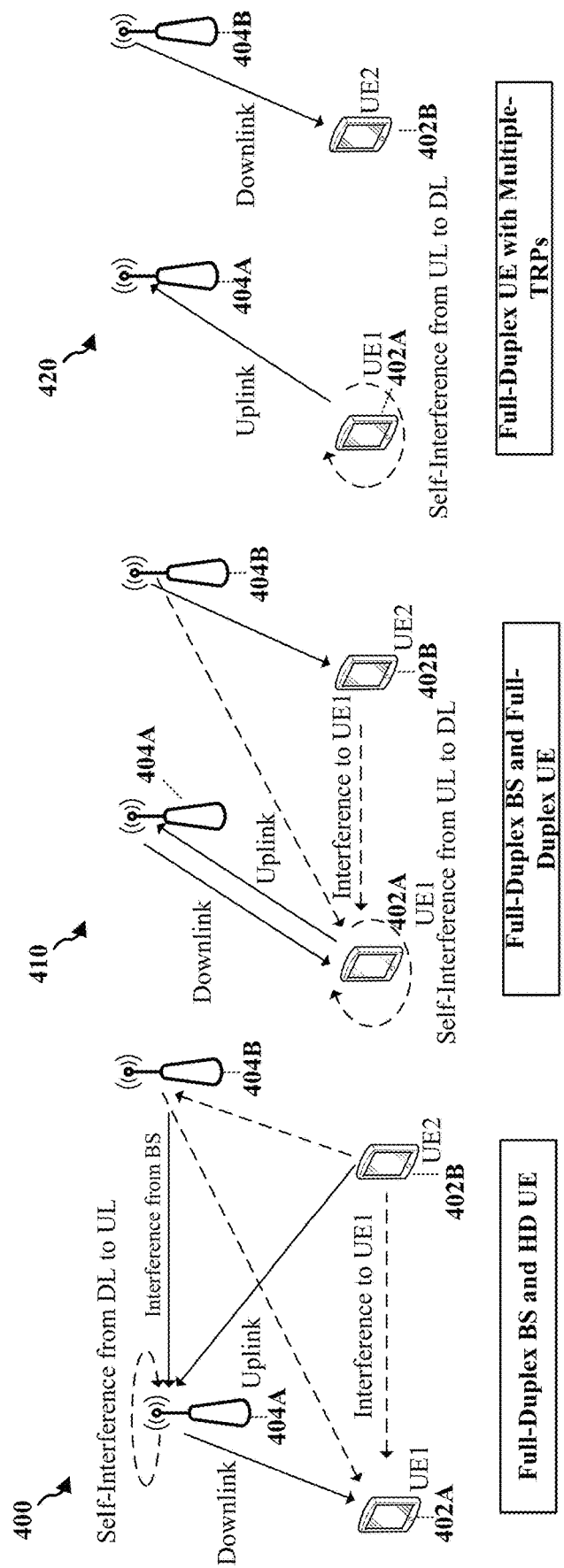
FIGS. 4A, 4B, and 4C are diagrams illustrating examples of full-duplex communication between base stations and UEs and associated interferences.

Similarly, as illustrated in diagram 410 in FIG. 4B, when the two base stations 404A and 404B and the two UEs UE1 402A and UE2 402B may each be operating in full-duplex mode, self-interference from uplink transmission to downlink reception at the UE (UE1 in the illustrated example) may also occur. Self-interference may occur from an uplink transmission of a UE to the downlink reception at the same UE even when the base station is not operating in full-duplex mode. As illustrated in diagram 420 in FIG. 4C, when the two base stations 404A and 404B operate in a half-duplex mode, and the UEs UE1 402A and UE2 402B operate in a full-duplex mode, self-interference from uplink transmission of UE1 to downlink reception at the UE1 402A may occur.

Figure 5:
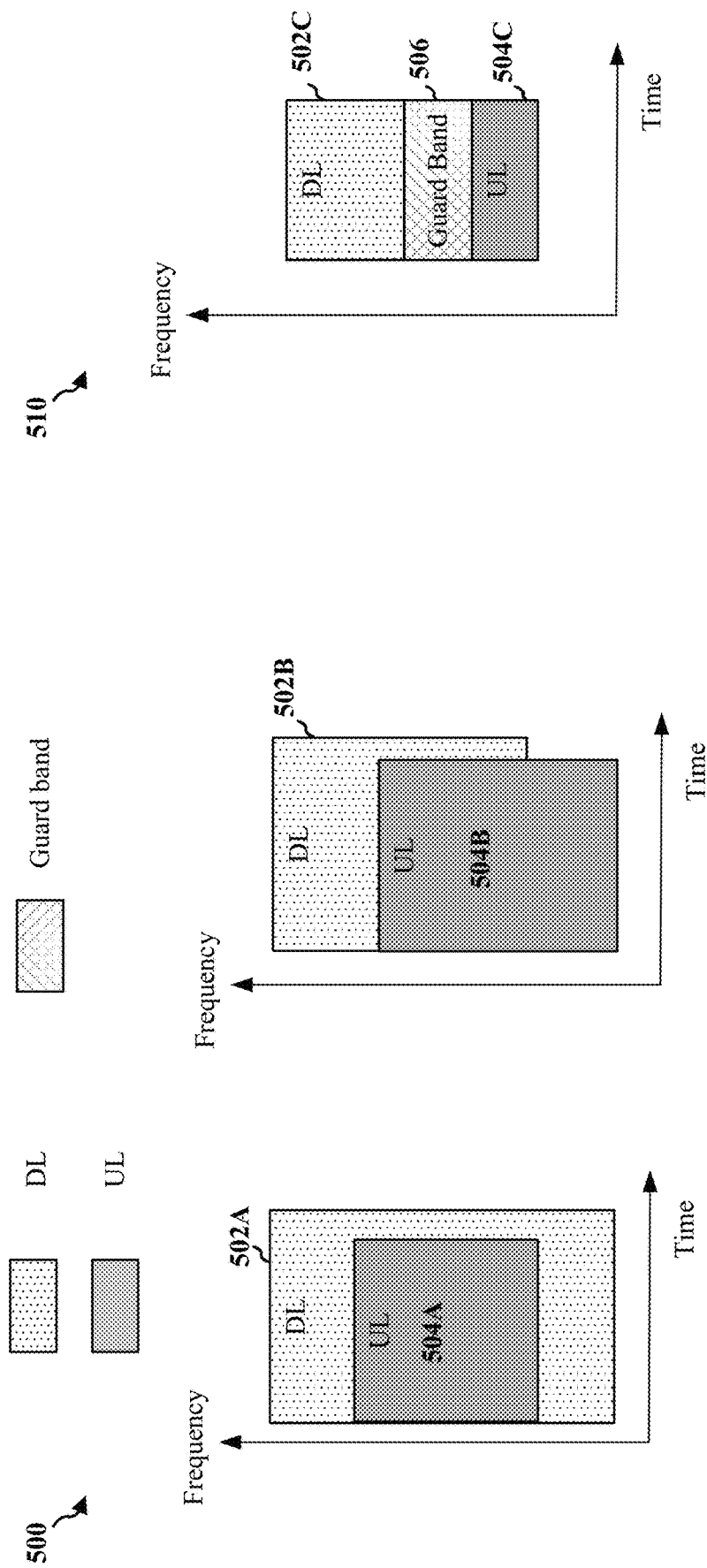
FIGS. 5A and 5B are diagrams illustrating examples of different types of full-duplex communication.

Full-duplex operation may be in the form of in-band full-duplex (IBFD) or sub-band frequency division duplexing (FDD) (otherwise known as "flexible duplex). As illustrated in diagram 500 in FIG. 5A, for IBFD, the transmission and reception may occur at the same time, e.g., overlapping in time, and on the same frequency resource, e.g., using overlapping frequency resources. As illustrated in FIG. 5A, the IBFD time/frequency resources for downlink 502A and IBFD time/frequency resources for uplink 504A may be fully overlapped in some examples. In other examples, IBFD time/frequency resources for downlink 502B and IBFD time/frequency resources for uplink 504B may be partially overlapped, as illustrated in FIG. 5A.

For sub-band FDD, as illustrated in diagram 510 in FIG. 5B, the transmission and reception may occur at the same time, e.g., at least partially overlapping in time, but on different frequency resources. The downlink resources 502C may be separated from the uplink resources 504C in frequency domain. The separation may be referred to as a guard band 506, for example, and may provide a frequency gap or frequency separation between the downlink frequency resources 502C and the uplink frequency resources 504C.

Figure 6:
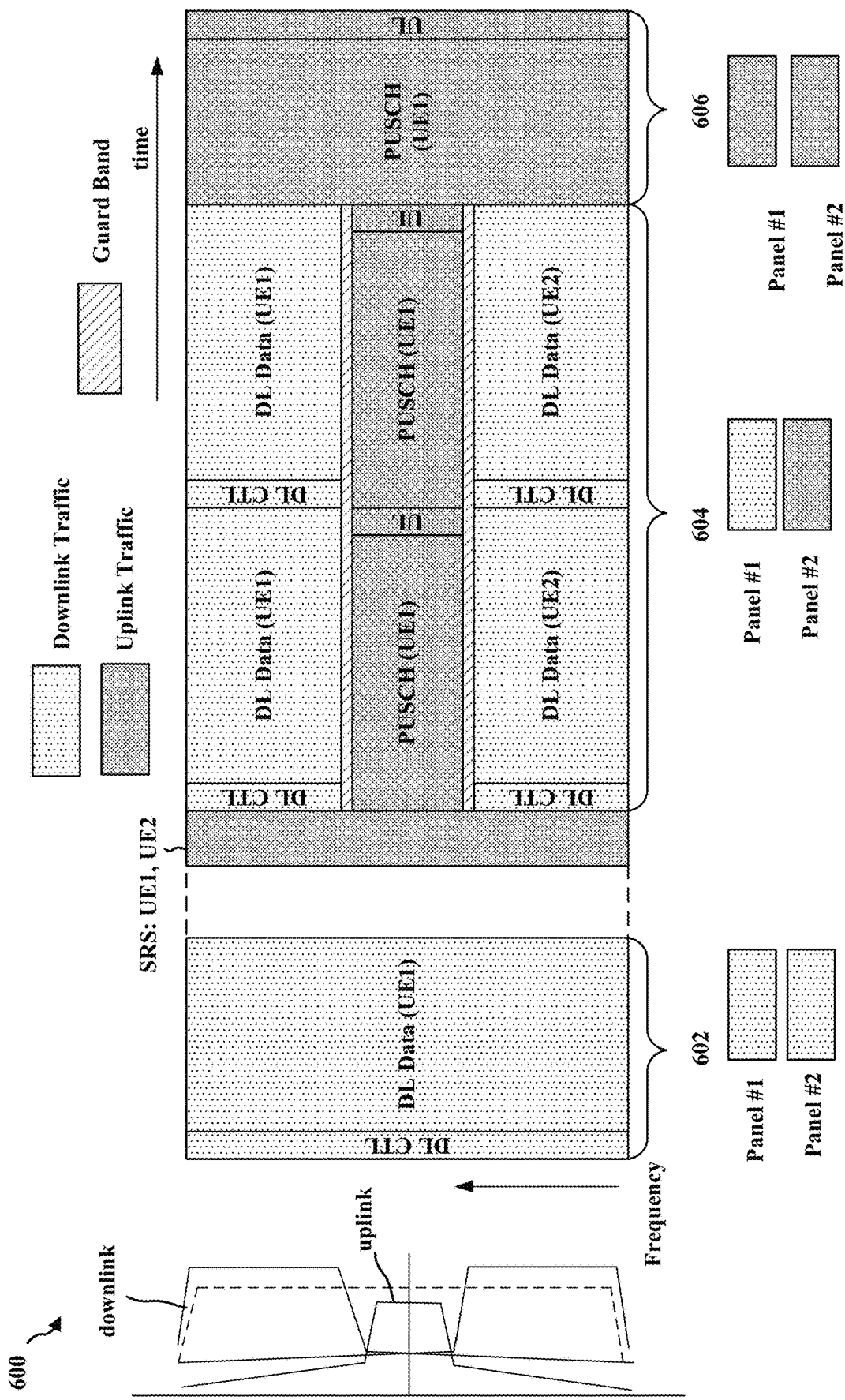
FIG. 6 is a diagram illustrating example leakage and mitigation between downlink and uplink for full-duplex communication.

FIG. 6 illustrates an example 600 showing half duplex and full-duplex communication. FIG. 6 illustrates half duplex communication during time periods 602 and 606 and full-duplex communication during time period 604. Without mechanisms for to mitigate interference between full-duplex uplink and downlink communication, leakage between downlink and uplink communication may severely degrade the communication. Full-duplex operation, may be based on two separate antenna panels at the UE or the base station. A first panel (panel #1) may be provided for downlink transmissions. For example, a base station may use the first panel to transmit downlink transmissions, whereas a UE may use the first panel to receive downlink transmissions. The downlink communication may be transmitted/received at both edges of a frequency band, such as illustrated in FIG. 6. A second panel (panel #2) may be used for uplink reception/transmission. For example, a base station may use the second panel to receive uplink transmissions, whereas a UE may use the second panel to transmit uplink transmissions. The uplink communication may be provided in the middle of the frequency band, as shown in FIG. 6. Additionally, for sub-band full duplex, the downlink communication and the uplink communication may not be in different portions of a frequency band, and may be separated in frequency by a guard band.

To provide better isolation between downlink and uplink communication, in one example, a reception time domain windowed overlap-and-add (Rx-WOLA) may be used on a downlink signal to reduce the adjacent channel leakage ratio (ACLR) leakage to uplink signal. In another example, an analog low pass filter (LPF) may be used to improve (analog digital conversion) ADC dynamic range. In yet another example, receiving (Rx)-automatic gain control (AGC) states may be improved to improve the noise figure (NF). In addition, digital integrated circuits of the ACLR leakage may be provided and a non-linear model may be provided per each receiving-transmitting pair may be provided.

A communication network may support the use of bandwidth parts (BWPs), where a BWP may be a contiguous set of PRBs on a given component carrier (CC). In other words, the BWP may be contiguous in frequency. Data and control channels may be received and/or transmitted within the BWP. The BWPs may provide the network with more flexibility in assigning resources in a given CC as the BWPs may enable multiplexing of different signals and signal types for a more efficient use of the frequency spectrum and of UE power. A CC may be divided into multiple BWPs (e.g., one to four BWPs per CC) for uplink and/or downlink transmissions. For example, a UE may be configured with up to four downlink BWPs and up to four uplink BWPs for each serving cell. Although multiple BWPs may be defined in the downlink and the uplink, in some aspects, there may be one active BWP in the downlink and one active BWP in the uplink at a given time on an active serving cell. The active BWP may define the UE's operating bandwidth within the cell's operating bandwidth. The UE may not use BWPs that are configured for the UE but are not activated (e.g., deactivated or otherwise not in the active state) to transmit or receive data.

As the UE may have one active BWP in the uplink and one active BWP in the downlink at a time, to switch from one BWP to another BWP, the UE may deactivate the current active DWP and activate next DWP. This may be referred to as "BWP Activation/Deactivation" and/or "BWP switching." There may be a delay time for the UE to switch from one BWP to another BWP, and the switch delay time may be long sometimes. There are multiple ways for a UE to initiate or perform the BWP switching. For example, the BWP switching may be configured to the UE through a DCI, where a specific BWP may be activated by a BWP indicator (e.g., BWP activation or deactivation command) in the DCI. For downlink BWPs, the BWP switching may be activated by a timer, such as a BWP inactivity timer (e.g., Bwp-Inactivity Timer: ServingCellConfig.bwp-InactivityTimer, etc.). The BWP switching may further be activated through an RRC signaling and/or by a MAC entity (e.g., MAC CE). Under Time Division Duplexing (TDD), the UE may perform the downlink BWP switching and the uplink BWP switching simultaneously, whereas under Frequency Division Duplexing (FDD) the UE may perform the downlink BWP switching and the uplink BWP switching independently.

As BWPs may be contiguous in frequency (e.g., contiguous RB allocation) while resources for sub-band full duplex (SBFD) operation may have disjoint downlink or uplink bandwidth (BW), aspects presented herein may enable an active uplink/downlink BWP to be used for the SBFD operation. Aspects presented herein may avoid or reduce BWP switching delay when separate BWPs are defined for the TDD and the SBFD slots.

Figure 7A:
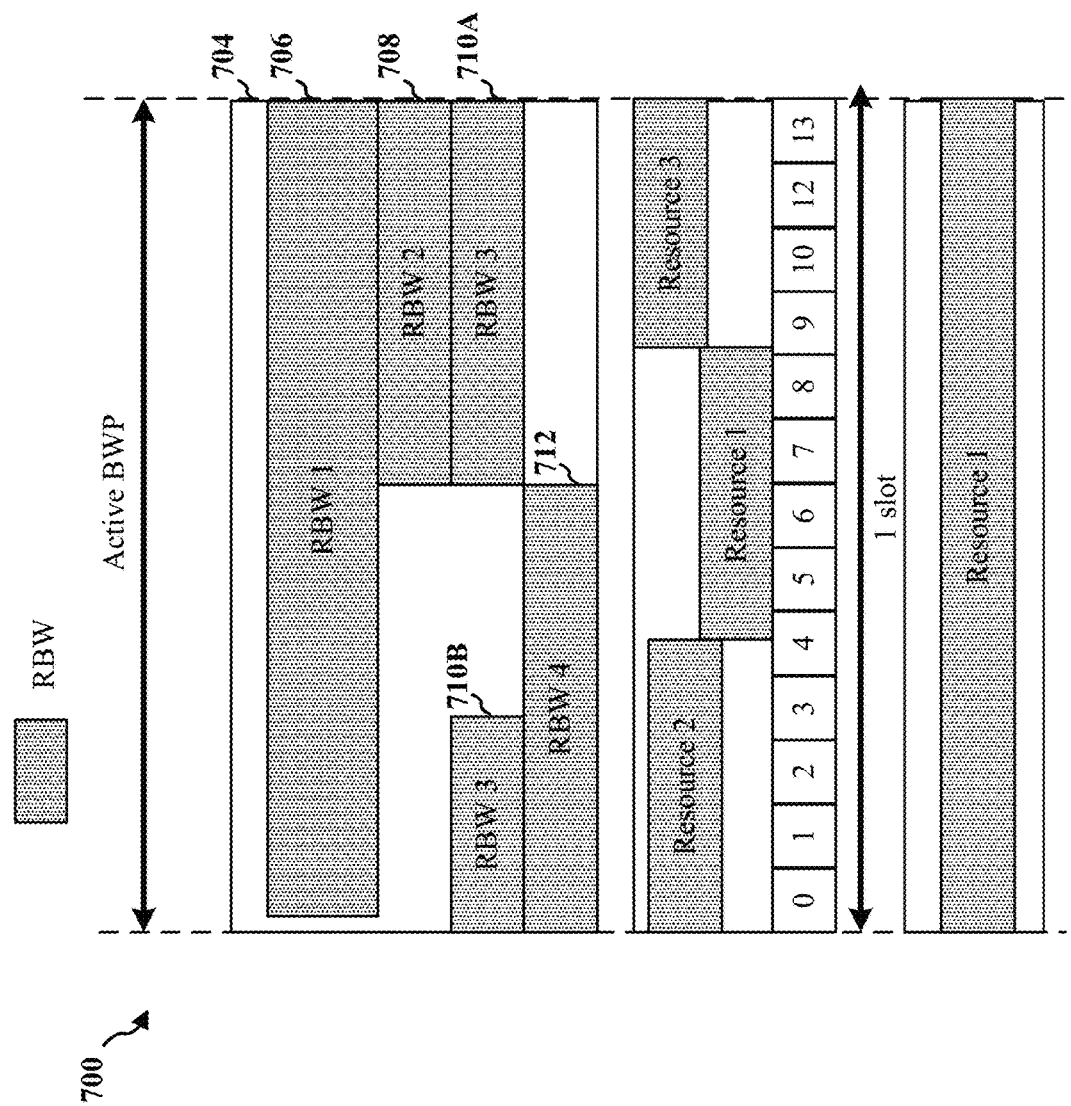
FIG. 7A is a diagram illustrating example RBWs within a BWP.

FIG. 7A is a diagram 700 illustrating example RBWs within a BWP 704. FIG. 7A illustrates there are 4 RBWs within an active BWP, namely RBW1 706, RBW2 708, RBW3 710A and 710B, and RBW4 712. Uplink and downlink communication may have different RBW configurations and may utilize different RBWs. Each of the RBWs may have their respective resources separately defined or configured. For example, a resource block group (RBG) may be separately configured and optimized for each of the RBWs. In addition, frequency domain resource assignment (FDRA) may be determined for each of the RBWs and may be defined with a smaller number of bits. RBWs for uplink and downlink may be non-overlapping or partially overlapping. In some aspects, RBWs for uplink and downlink may be non-overlapping for SBFD and may be partially overlapping for IBFD, such as described in connection with FIGS. 5A and 5B. The active resource bandwidth may be dynamically indicated from the base station to the UE, such as in DCI. In some aspects, a DCI indication may be slot based, i.e., all symbols within the slot may have the same active RBW. In some aspects, the symbols may be grouped in a bundle of N symbols. In some aspects, the time domain resource assignment (TDRA) may be indicated per resource in the DCI.

Figure 7B:
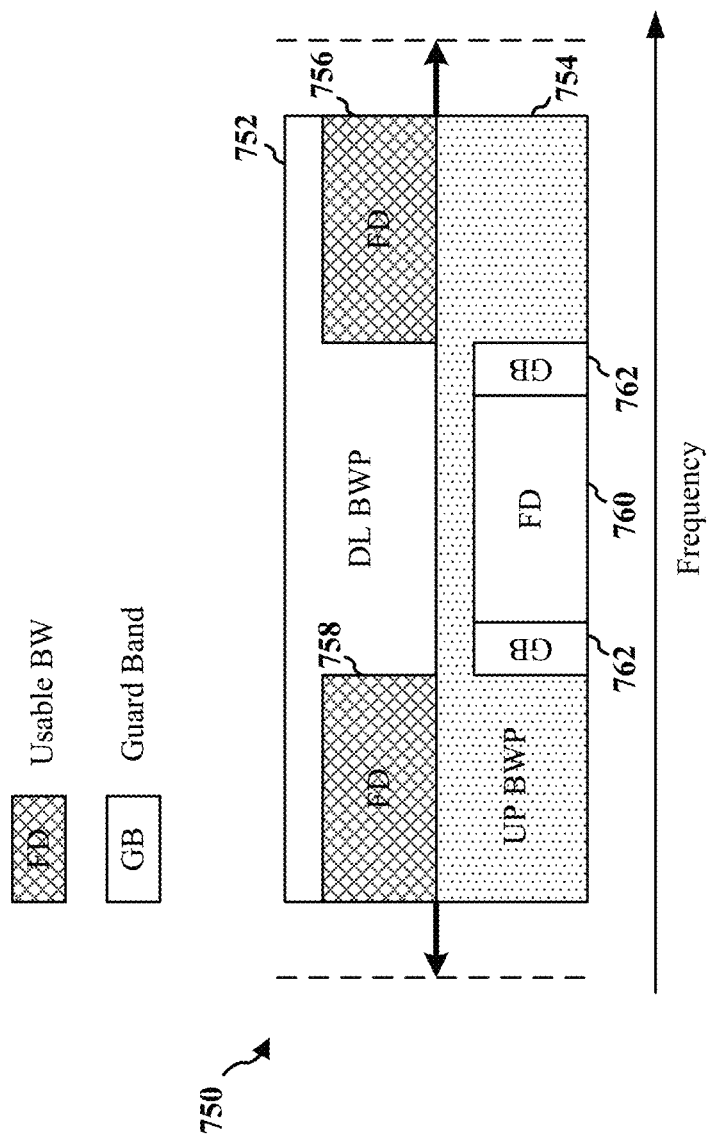
FIG. 7B is a diagram illustrating an example of downlink/uplink BWP configuration for an SBFD operation.

As BWPs may be contiguous in frequency (e.g., contiguous RB allocation) while resources for sub-band full duplex (SBFD) operation may have disjoint downlink or uplink bandwidth (BW), aspects presented herein may enable an active uplink/downlink BWP to be used for the SBFD operation. Aspects presented herein may avoid or reduce BWP switching delay when separate BWPs are defined for the TDD and the SBFD slots. FIG. 7B is a diagram 750 illustrating an example downlink/uplink BWP configuration for an SBFD operation. As not all of the BWPs or BW(s) within a BWP may be useable at a given time under the SBFD operation, which BWs within an active BWP is to be used by the UE for uplink and/or downlink may further be defined or configured for the UE. For example, the UE may be configured to use BWs 756 and 758 within the downlink BWP 752 for the downlink, and may use the BW 760 within the uplink BWP 754 for the uplink. The BWs 756, 758 may be referred as a subset of a BWP or as a usable BW in the DL BWP. The usable BW(s) in each BWP may be segmented as shown by FIG. 7, where each usable BW may occupy different frequency range in the uplink/downlink BWP. A guard band 762 (e.g., gap) may also be provided between the usable BW of the active downlink and uplink BWP to reduce or prevent interference. Thus, a usable BW in a downlink BWP may be a subset of the downlink BWP (e.g., 756), excluding the frequency resources used as guard band (e.g., 762) or for uplink transmission (e.g., 760). This configuration of BWP may enable implicit switching between half-duplex and full-duplex mode based on the duplexing nature of a time slot or symbols.

Figure 8:
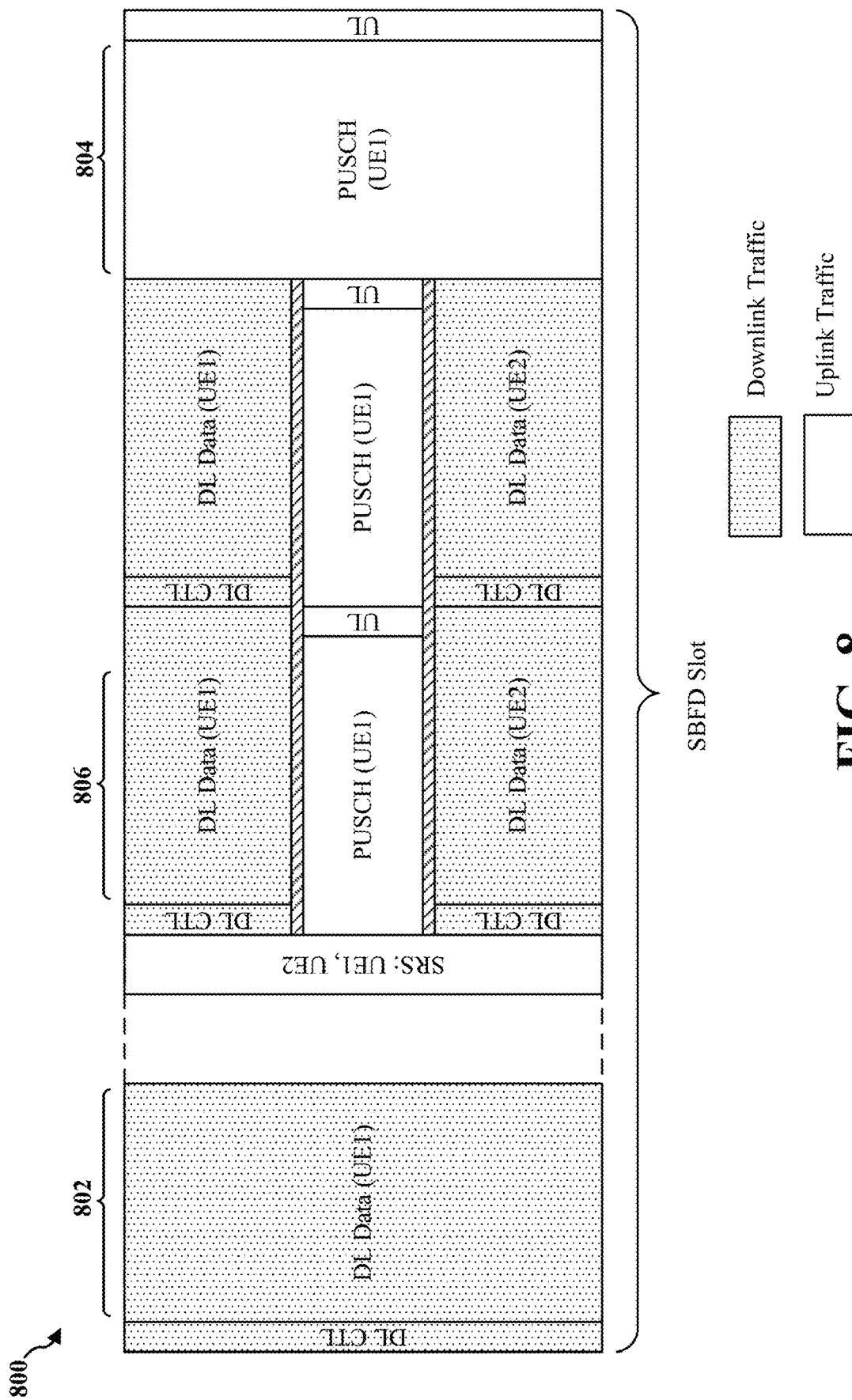
FIG. 8 is a diagram illustrating an example format for a sub-band full duplex (SBFD) slot.

FIG. 8 is a diagram 800 illustrating an example format for an SBFD slot 802, where the SBFD slot may include both downlink and uplink resource allocation for a wireless device, and may be referred to as a "D+U slot" for purpose of the present disclosure. Although referred to as an SBFD slot, 802 may correspond to one or more slots in a time period, in some examples. In one aspect, a D+U slot may be a slot in which the frequency band is used for both the uplink and the downlink transmissions. The uplink and the downlink transmissions may occur in overlapping frequency bands (e.g., in-band full-duplex) or in adjacent frequency bands (e.g., sub-band full-duplex), such as described in connection with FIGS. 5A and 5B. For example, in a given symbol or symbols within a D+U slot, a half-duplex UE may either transmit data in the uplink band or receive data in the downlink band, whereas a full-duplex UE may transmit data in the uplink band and/or receive data in the downlink band. As such, a 'D+U' slot may contain downlink symbols, uplink symbols or full-duplex symbols (e.g., combination of both uplink and downlink symbols). For example, a full-duplex UE may both transmit and receive data using symbol(s) within the SBFD slot 802, whereas a half-duplex UE may either transmit or receive data at symbol(s) within the SBFD slot 802. Other time periods, such as slots may be for downlink data, such as 806, or uplink data, such as 804 may also be included.

A BWP may further be configured with various parameters which may include numerology, frequency location, bandwidth size, and/or control resource set (CORESET). A CORESET may define the frequency domain resource blocks (RBs) and time domain duration (i.e., number of consecutive symbols) of the control region of PDCCH. For example, a CORESET may correspond to a set of physical resources in time and frequency that a UE uses to monitor for PDCCH/DCI, where each CORESET may include one or more resource blocks in the frequency domain and one or more symbols in the time domain. As an example, a CORESET may include multiple RBs in the frequency domain and 1, 2, or 3 contiguous symbols in the time domain. A Resource Element (RE) is a unit indicating one subcarrier in frequency over a single symbol in time. A Control Channel Element (CCE) includes Resource Element Groups (REGs), e.g., 6 REGs, in which an REG may correspond to one RB (e.g., 12 REs) during one OFDM symbol. REGs within a CORESET may be numbered in an increasing order in a time-first manner, starting with 0 for the first OFDM symbol and the lowest-numbered resource block in the control resource set. A UE may be configured with multiple CORESETs (e.g., up to three), each CORESET being associated with a CCE-to-REG mapping. Each CORESET may be assigned with a CORESET identifier (ID). As each UE may use up to four BWPs in a transmission, a UE may be configured with up to 12 CORESETs on a serving cell, where each CORESET may be assigned with an index of 0-11 (e.g., CORESET #0, CORESET #1, CORESET #2). CORESET with ID=0 (e.g., CORESET #0) may be configured by a master information block (MIB).

A UE may perform blind decoding for a set of PDCCH candidates, where PDCCH candidates to be monitored may be configured for the UE by search space (SS) sets. Thus, a SS set associated with a CORESET may be used to define the slot pattern and starting symbol of the control region in each slot of the pattern. A UE may determine the slot for monitoring SS set based on (periodicity k, offset o, duration T<k). There may be one or more types of SS sets, such as a common SS (CSS) set that is generally monitored by a group of UEs in a cell, and there may be a UE-specific SS set that is monitored by a specific UE, etc. For example, a Type0-PDCCH CSS set may be used for PDCCH scheduling system information block 1 (SIB1), a Type0A-PDCCH CSS set may be used for PDCCH scheduling other system information (OSI), a Type1-PDCCH CSS set may be used for PDCCH relating to random access, a Type2-PDCCH CSS set may be used for PDCCH scheduling page message, a Type3-PDCCH CSS set may be used for all the other PDCCHs monitored in CSS, a UE specific search space (USS) set may be used for PDCCH scheduling UE specific data, etc.

Figure 9:
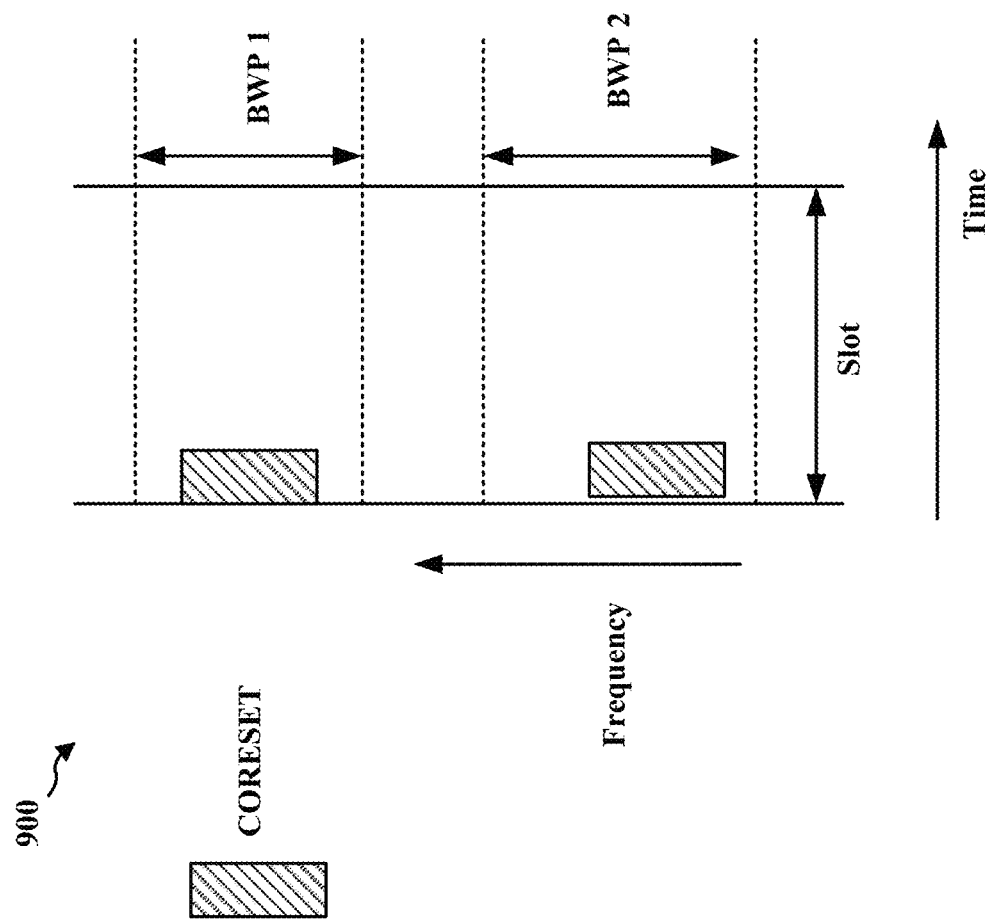
FIG. 9 is a diagram illustrating an example of multiple BWPs, and a CORESET for each BWP.

CORESETs may be defined at the cell level and the list of CORESETs to be monitored by a UE may be indicated in an active BWP. A base station may configure multiple CORESETs and multiple SS sets for a UE in an active BWP. For example, the base station may configure up to three CORESETs and 10 SS sets per BWP for the UE. As a UE may be configured for multiple BWPs (e.g., up to four BWPs), the UE may be configured with up to 40 SS sets and 12 CORESETs, where each SS set may be assigned with an index of 0-39 and each CORESET may be assigned with an index of 0-11). Each SS set may be associated with a CORESET. Each CORESET ID of the CORESETs configured for the UE may map to a particular BWP, and each SS set ID of the multiple SS sets configured for the UE may map to a particular BWP, for example. FIG. 9 illustrates an example time and frequency diagram 900 showing multiple BWPs, and a CORESET for each BWP. A SS may include a set of CCEs, e.g., at different aggregation levels. For example, the SS may indicate a number of candidates to be decoded, e.g., in which the UE performs decoding.

Figure 10:
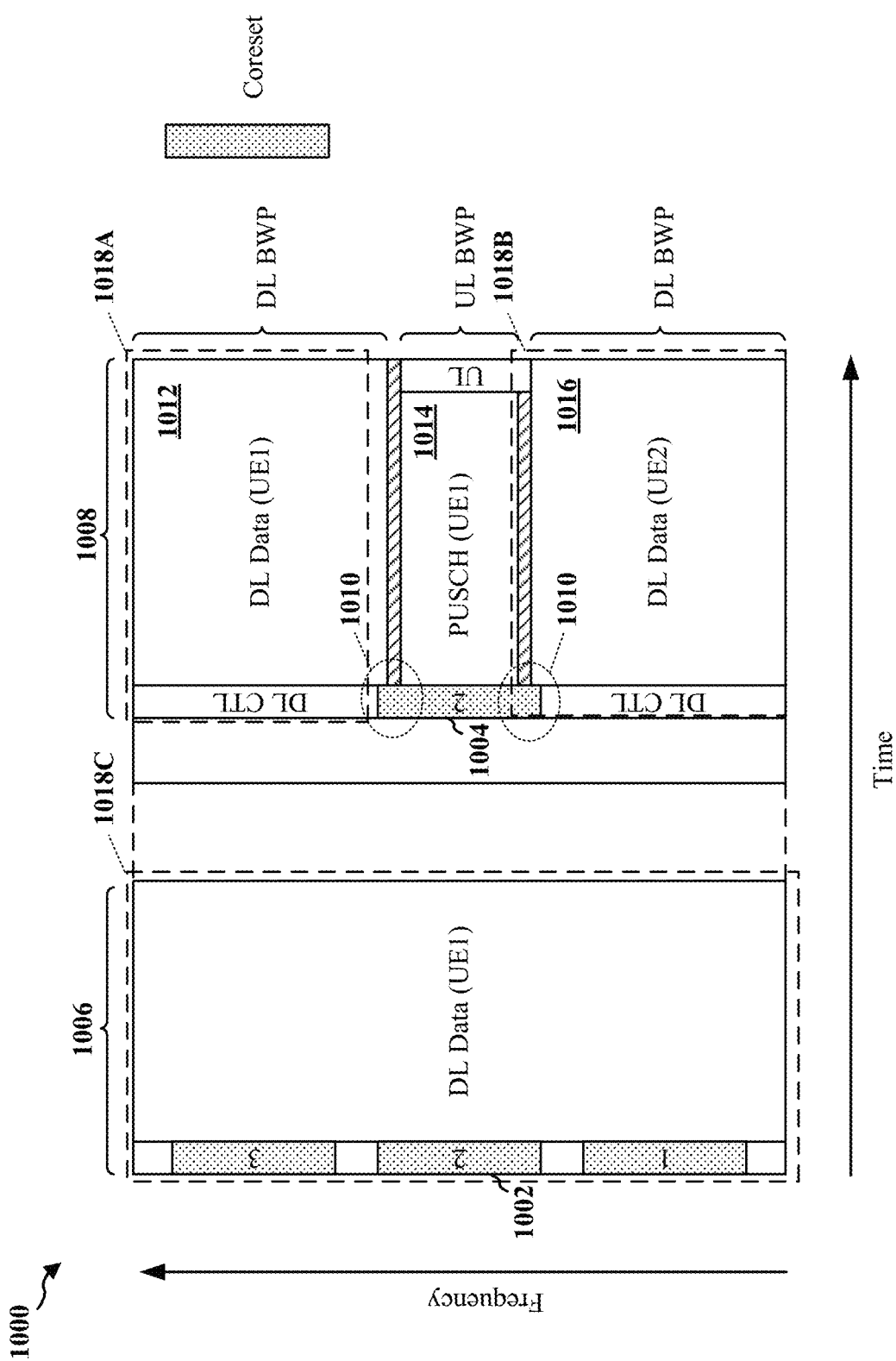
FIG. 10 is a diagram illustrating an example CORESET configuration for half duplex (HD) and SBFD slots.

The frequency domain resources of a CORESET may be defined by a bit string (i.e., bitmap), where each bit of the bit string may map or correspond to 6 RBs in a BWP (e.g., frequencyDomainResources, BIT STRING (SIZE (45), etc.), and a UE may monitor CORESETs defined within an active BWP. However, as not every part of BW is usable in the BWP of an SBFD slot (i.e., a subset of BWP may be usable in the SBFD slot, such as shown by FIG. 7), a CORESET associated with a BWP may partially or completely fall outside of a usable BW in the SBFD slot. For example, FIG. 10 is a diagram 1000 illustrating an example CORESET configuration for HD and D+U slots (e.g., SBFD slot) for a UE. A CORESET #2 may be monitored in a downlink regular HD slot 1006 at 1002. However, when the CORESET #2 is monitored in a D+U slot 1008 at 1004, the CORESET #2 may overlap or intersect with both the downlink (e.g., 1012, 1016) and the uplink (1014) BWPs, such as shown at 1010. As the UE may be configured to monitor CORESETs defined within an active BWP (e.g., UL BWP), the UE may not be able to monitor the CORESET #2 at 1004 in this case.

Aspects presented herein may provide more flexibility for the configuration of CORESET frequency domain resources. For example, some aspects may provide more flexibility for the configuration of CORESET frequency domain resources, where overlapping or intersecting between CORESETs and both downlink and uplink BWPs in an SBFD slot may be reduced or avoided.

In some aspects, CORESET(s) may be defined at a cell level and CORESET(s) to be monitored may be indicated in an active BWP. In some example, a full-duplex aware UE (a UE that is aware of full-duplex operation within a communication system but not configured to perform full-duplex operation) may be configured to exclude monitoring occasions for CORESET(s) that fall partially or completely outside of an active RBW of the one or more RBWs 1018A, 1018B, and 1018C, such as shown by the CORESET #2 at 1004 in FIG. 10.

Figure 11:
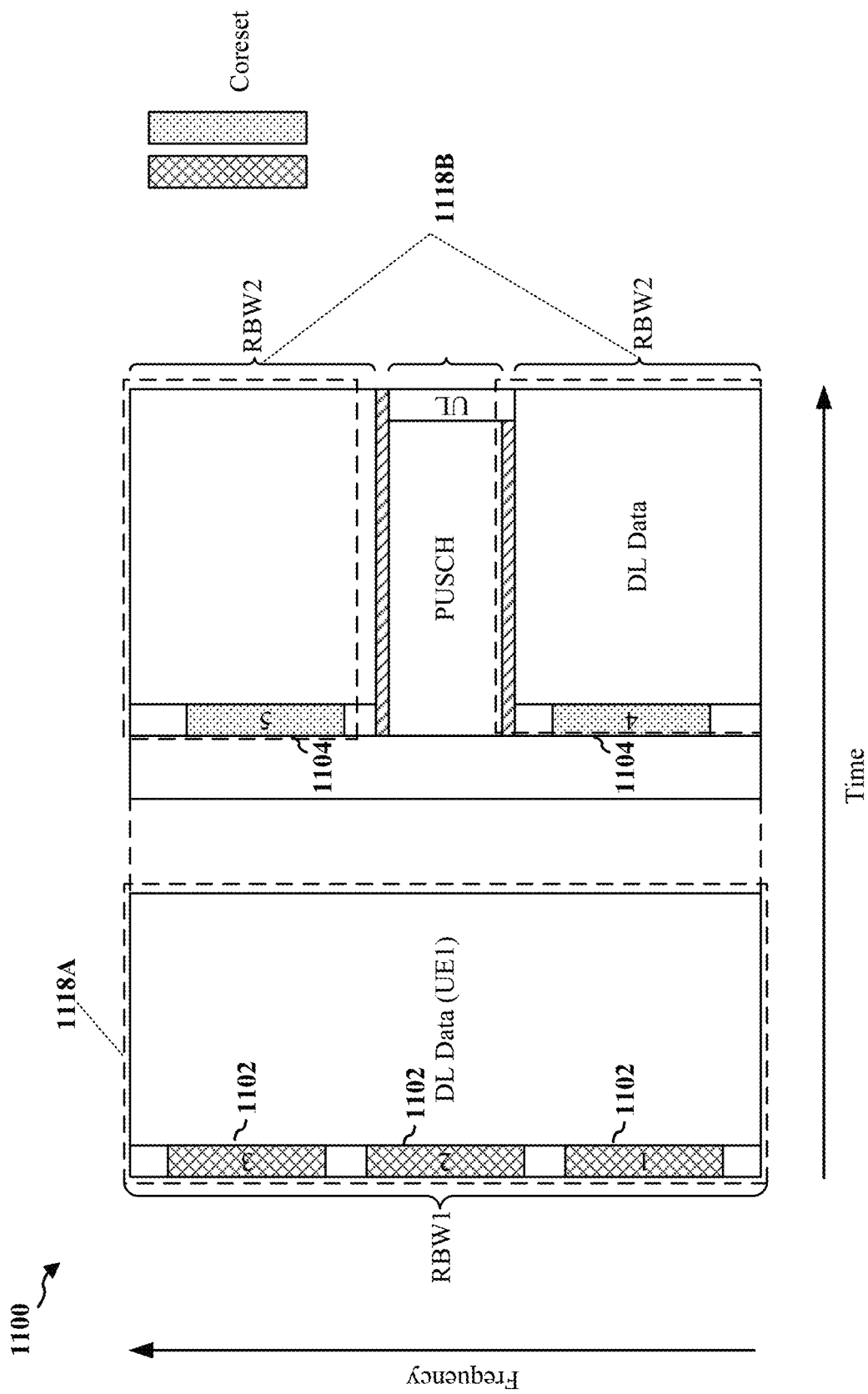
FIG. 11 is a diagram illustrating an example CORESET configuration.

To allow more flexibility and to compensate for the limitation of excluding monitoring occasions, in one set of aspects, as illustrated in the example 1100 in FIG. 11, CORESET(s) may be configured to be associated with each of the one or more RBWs 1108A and 1108B. For example, CORESET #1, #2, and #3 1102 may be associated with RBW1 1118A and CORESET #4 and #5 1104 may be associated with RBW2 1118B. In some aspects, the CORESET(s) to be monitored may be indicated in the active RBW and the UE may not monitor CORESET(s) outside the active RBW. For example, if RBW2 1118B is the active RBW, the UE may monitor CORESET #4 and #5 1104. Accordingly, the UE may have more flexibility in receiving downlink transmission and/or monitoring for CORESET(s).

The UE may monitor monitoring occasions for CORESET(s) that are within an active RBW of the one or more RBWs regardless of whether the base station is operating under a half-duplex mode or under a full-duplex mode. The CORESET(s) to be monitored may be indicated in the active RBW with a maximum number of CORESETs per BWP (e.g., 4 or another number). In some aspects, a UE is still configured to exclude monitoring occasions for the CORESET(s) that fall partially or completely outside the active RBW.

In some aspects, a configuration that a bitmap of frequency resources that corresponds with resource blocks (RBs) in the one or more RBWs may be transmitted to the UE. In some aspects, the UE may also receive a configuration of one or more search space (SS) sets in a RBW and a SS set that defines one or more monitoring occasions of a CORESET in the RBW.

In another set of aspects, CORESET(s) may be associated with the BWP instead of the one or more RBWs. The interpretation of a bitmap/bit string (such as a bitmap frequencyDomainResources) may be different for each RBW. For example, in some aspects, the UE may map a subset of the bitmap of the configured frequency domain resources may be used and may map the bits to each of the one or more RBWs (RBW_i) instead of the entire BWP.

In some aspects, a field or an indication may be added to the information element (IE) of the SS definition. For example, a field, such as a mode field, may be added to the IE of the SS to indicate whether the bitmap associated with a BWP is to be interpreted under half-duplex mode or under full-duplex mode. When the mode field indicates half-duplex mode, the bitmap may be interpreted to map the entire BWP, whereas when the mode field indicates full-duplex mode, the bitmap may be interpreted to map the active RBW of the one or more RBWs without mapping the inactive RBWs. In other words, when an SS is defined to monitor the CORESET in an SBFD slot and under full-duplex mode, the UE may interpret the bitmap to correspond to RBs in the active RBW of the BWP. Thus, one type of SS may be used for the HD slot (e.g., under half-duplex mode) and another type of SS may be used for the D+U slot (e.g., under full-duplex mode), etc.

In one aspect, a full-duplex aware UE (e.g., UE that may be aware of full-duplex operation presented in the communications system, but is unable to perform full-duplex operation) may be configured to exclude monitoring occasions for CORESET(s) that fall partially or completely outside of a usable BW in an SBFD slot when the base station is operating under full duplex mode, such as shown by the CORESET #2 at 1004 in FIG. 10. However, the UE may continue monitoring occasions for CORESET(s) that are within the usable BW. In additionally or optionally, to compensate for this configuration or limitation, the maximum number of CORESETs in a BWP may be increased, such that additional CORESET(s) may be configured for the UE (e.g., through SS sets) to allow more flexibility in frequency location of monitoring occasions. For example, as shown by diagram 1100 in FIG. 11, additional CORESET #4 (e.g., in addition to CORESET #1 to #3) may be configured to the UE for monitoring, such as shown at 1104. As the CORESET #2 (e.g., 1102) may not be used in the S+D slot 1108 due to overlapping, the UE may have more flexibility in receiving downlink transmission and/or monitoring for CORESET(s) by having additional CORESET(s) configured in BWPs (e.g., SBFD slots). The configuration(s) for SS may also remain unchanged, where each SS set may still be associated with a CORESET. In addition, the base station may configure the UE to refrain from monitoring more than certain number of CORESETs in a given slot. For example, the UE may be configured to refrain from monitoring more than four CORESET in any given slot. Thus, referring back to FIG. 11, the UE may monitor CORESET #2 (e.g., 1102) and the new additional CORESET #4 (e.g., 1104) at different time slots. As the CORESETs are not allocated within the same time slot, increasing the maximum number of CORESET and/or configuring additional CORESET for the UE may not increase the complexity of the system and/or the implementation. In one other example, the base station may configure the UE to monitor up to four CORESETs in an active downlink BWP when the base station is operating under half-duplex mode, and the base station may configure the UE to monitor additional CORESETs (e.g., in addition to four CORESETs) when the base station is operating under full-duplex mode. Thus, the UE may monitor more than four CORESETs (e.g., five, six CORESETs, etc.) when the base station is operating under full-duplex mode. The base station may configure the UE through the SS set(s), where the SS set(s) may be associated with the CORESETs, and the SS may also define the monitoring occasions for the CORESETs in the usable BW.

In one other aspect, in a full-duplex operation, an additional or different interpretation/configuration of the bitmap/bit string (e.g., frequencyDomainResources) that corresponds to the CORESET may be applied by a UE at a monitoring occasion (e.g., CORESET monitoring) in an SBFD slot, e.g., while the max number of CORESETs remains the same (e.g., up to three). In one example, in a half-duplex operation where there is no D+U slot, bits of the bitmap for a CORESET may be mapped to a whole BWP, such as shown by diagram 1200A in FIG. 12A, and each bit of the bitmap may correspond to 6 RBs in the BWP. On the other hand, during a full-duplex operation involving D+U slot(s), if the size of usable BW(s) is equal to 'd' RBs ('d' being a value), a subset (e.g., a portion) of the bitmap may be used where the bits of the bitmap may be mapped to the usable BW (e.g., 'd' RBs) instead of the whole BWP. For example, as shown by diagram 1200B in FIG. 12B, instead of mapping the bitmap to the whole BWP as shown in FIG. 12A, the bitmap 1202 for the monitoring occasion under full-duplex operation (e.g., in the SBFD slot) may be configured to map to the usable BW (e.g., 1204 and 1206), and may exclude mapping for non-usable BW(s).

Figure 12A:
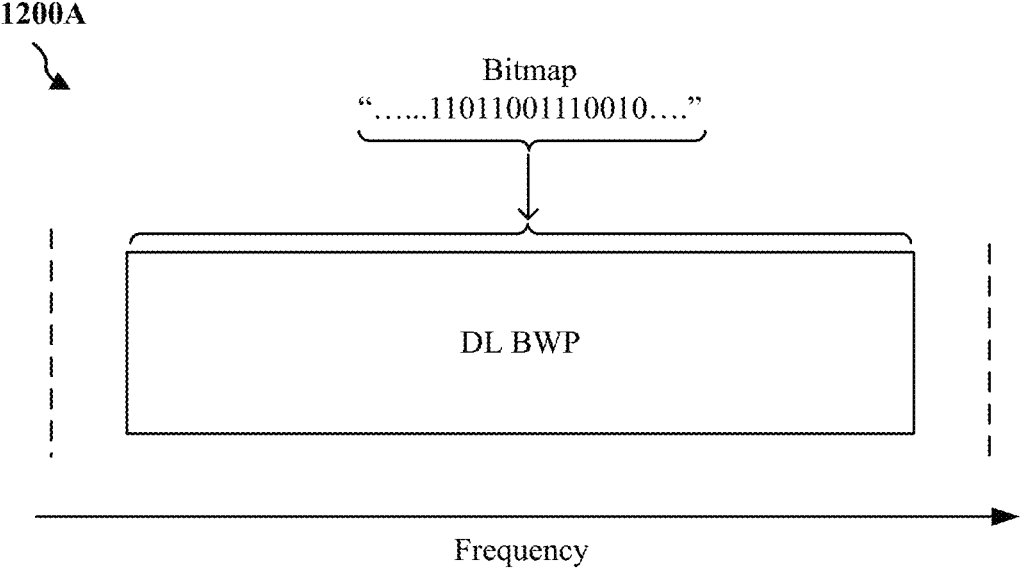
FIGS. 12A and 12B are diagrams illustrating examples of bitmaps for CORESETs.
Figure 12B:
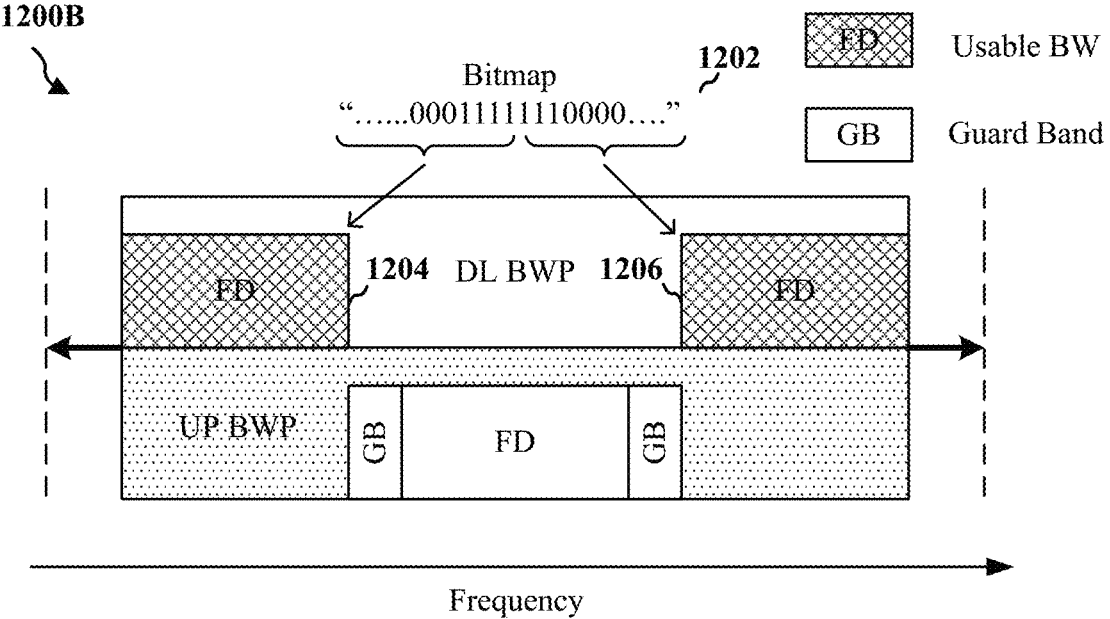

For a UE to interpret between the bitmap (e.g., frequencyDomainResources) for half-duplex operation (e.g., base station operating under half-duplex mode) described in FIG. 12A and the bitmap for full-duplex operation (e.g., base station operating under full-duplex mode) described in FIG. 12B, a field or an indication may be added to the information element (IE) of the SS definition. For example, a field (e.g., a mode field) may be added to the IE of the SS to indicate whether the bitmap associated with a BWP is to be interpreted under half-duplex mode or under full-duplex mode. When the mode field indicates half-duplex mode, the bitmap may be interpreted to map the whole BWP, whereas when the mode field indicates full-duplex mode, the bitmap may be interpreted to map the usable BW without mapping the unusable BW. In other words, when an SS is defined to monitor the CORESET in an SBFD slot and under full-duplex mode, the UE may interpret the bitmap to correspond to RBs in the usable BW of the BWP. Thus, one type of SS may be used for half-duplex slot (e.g., under half-duplex mode) and another type of SS may be used for the D+U slot (e.g., under full-duplex mode), etc.

In yet one other aspect, instead of applying a different interpretation or configuration for the bitmap/bit string (e.g., frequencyDomainResources) of the CORESET at a monitoring occasion in the SBFD slot, the UE may receive two frequency domain resources definition for the CORESET in a configuration from the base station. In this example, the maximum number of CORESETs may remain the same (e.g., up to three) for SBFD slots or half-duplex slots. In one example, a new field (e.g., frequencyDomainResources_FD) may be used to define frequency domain resources of a CORESET in an SBFD slot (e.g., D+U slot) for the communication system. Thus, for half-duplex slots (e.g., under half-duplex operation), CORESETs may be defined by a first frequency domain definition (e.g., frequencyDomainResources), whereas for SBFD slots, CORESETs may be defined by a second frequency domain definition (e.g., frequencyDomainResources_FD), etc. Similarly, for a UE to determine which frequency domain definition to use for the CORESET, a field or an indication may be added to the IE of the SS definition. For example, a mode field may be added to the IE of the SS to indicate to the UE whether to use the frequency domain definition associated with half-duplex mode (e.g., half-duplex slot) or to use the frequency domain definition associated with full-duplex mode. Thus, when the IE of the SS indicates half-duplex mode, the UE may use the frequency domain definition associated with half-duplex mode (e.g., frequencyDomainResources) whereas when the IE of the SS indicates full-duplex mode, the UE may use the frequency domain definition associated with full-duplex mode (e.g., frequencyDomainResources_FD).

Figure 13:
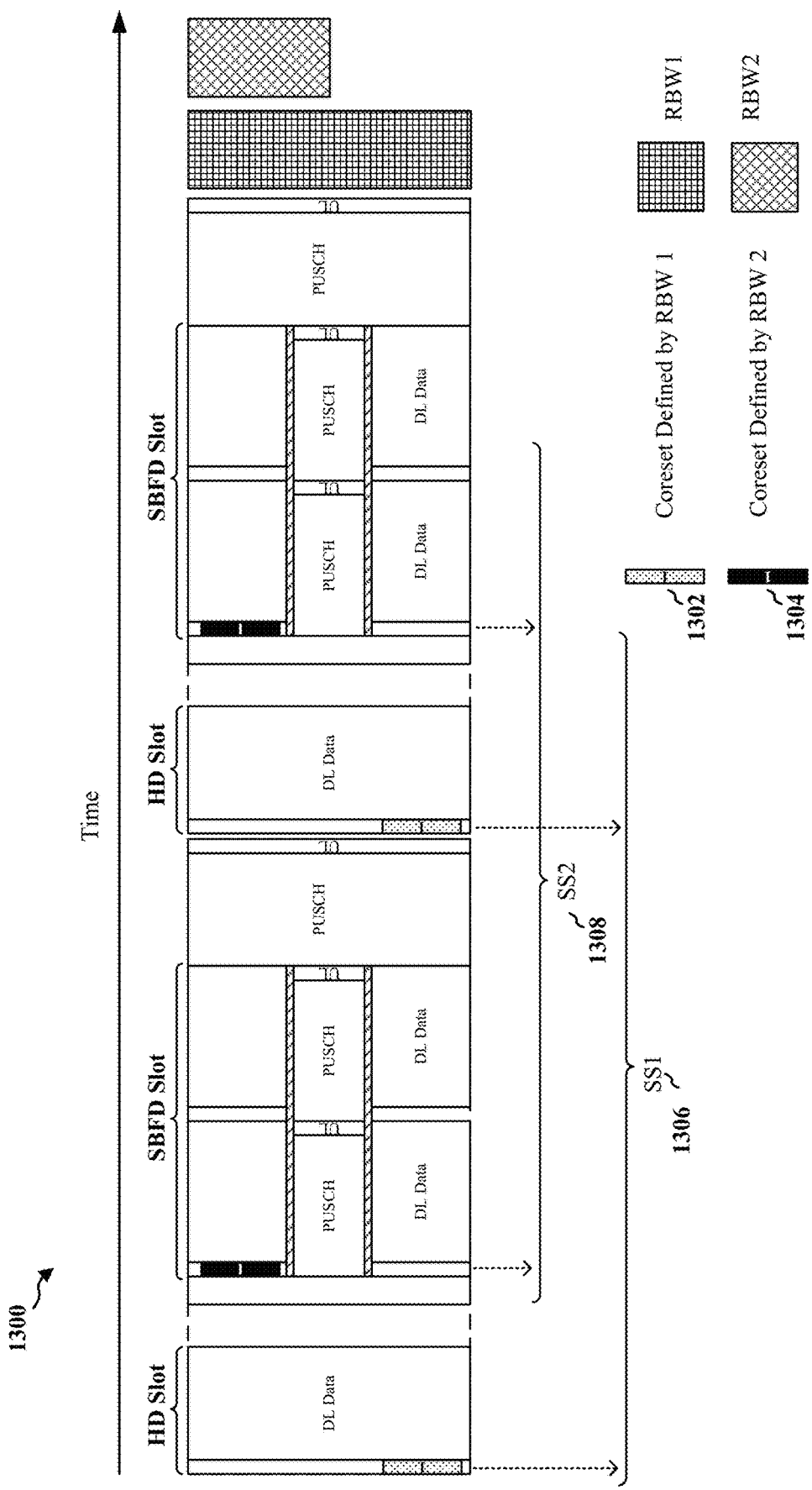
FIG. 13 is a diagram illustrating an example CORESET configuration.

FIG. 13 is a diagram 1300 illustrating an example implementation of two frequency domain interpretations. A first SS SS1 1306 may define monitoring occasions in the regular HD slots and may be associated with the CORESET defined by RBW1 at 1302. Similarly, a second SS SS2 1308 may define monitoring occasions in the SBFD slots and may be associated with the CORESET defined by RBW2 at 1304.

In another set of aspects, the CORESET(s) may still be associated with the BWP and instead of defining a different interpretation or configuration for the bitmap/bit string (e.g., frequencyDomainResources) of the CORESET, a list of bitmaps, such as frequencyDomainResources_RBW_i, that may each define the frequency domain resources for each of the different RBWs may be provided. A SS for the CORESET in RBW_i may monitor frequency domain resources indicated by frequencyDomainResources_RBW_i. In one example, a new field (e.g., frequencyDomainResources_RBW_i) may be used to define the RBW associated with the CORESET in an SBFD slot (e.g., D+U slot) for the communication system. Thus, for regular HD slots (under half-duplex operation), CORESETs may be defined by a first frequency domain definition (e.g., frequencyDomainResources), whereas for SBFD slots, CORESETs may be defined by a second frequency domain definition (e.g., frequencyDomainResources_RBW_i) according to the active RBW.

Figure 14:
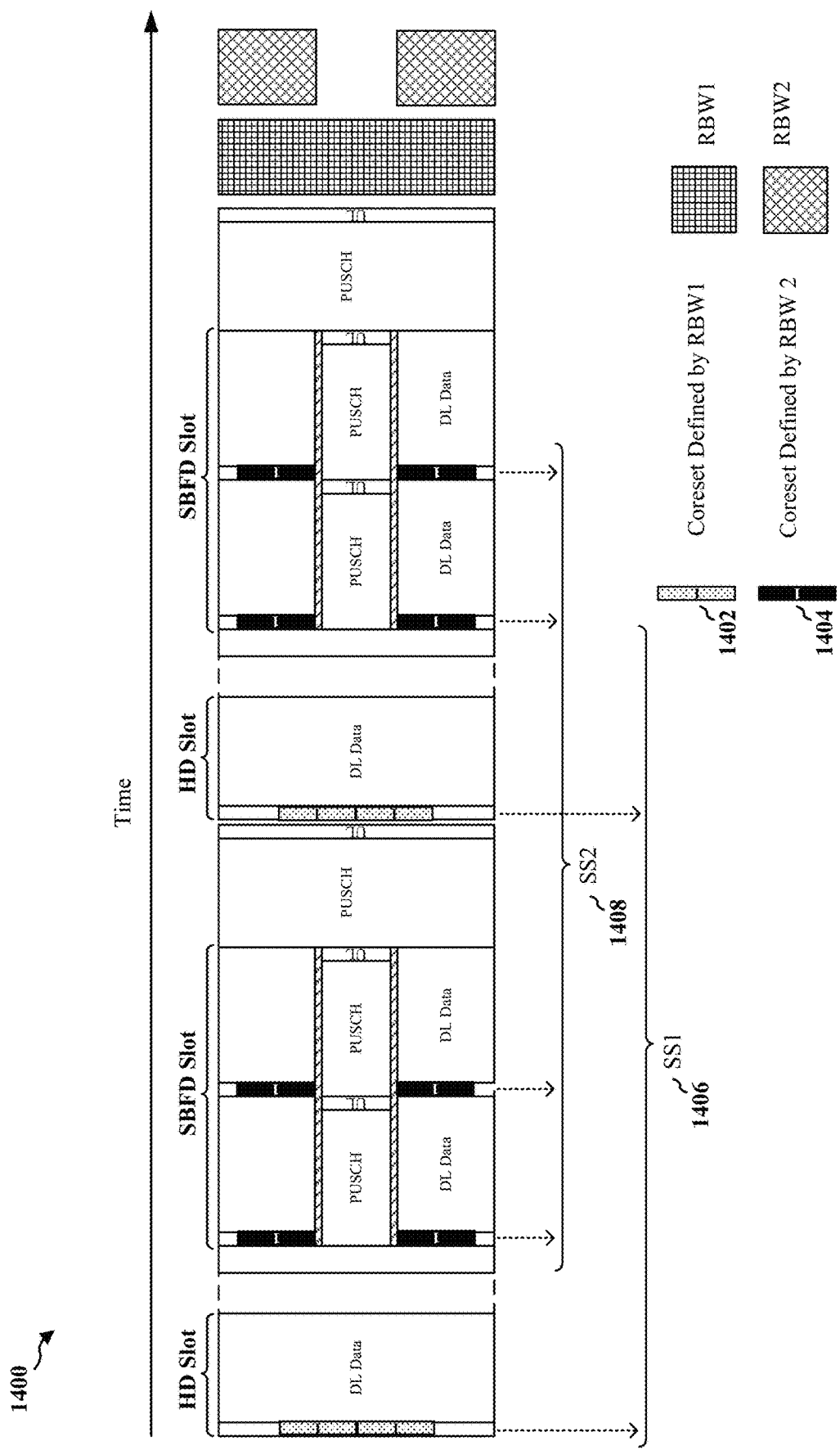
FIG. 14 is a diagram illustrating an example CORESET configuration.

FIG. 14 is a diagram 1400 illustrating an example implementation of two frequency domain definitions, where a first frequency domain definition (e.g., frequencyDomainResources_RBW_1) may be provided for CORESETs (e.g., CORESET #1 at 1402) in a first RBW (e.g., under full-duplex operation) and a second frequency domain definition (e.g., frequencyDomainResources_RBW_2) may be provided for CORESETs (e.g., CORESET #1 at 1404) in a second RBW (e.g., also under full-duplex operation). In addition, a first SS, e.g., SS1 1406, may be configured to define monitoring occasions associated with the CORESET #1 at 1402. Similarly, a second SS, e.g., SS2 1408, may be configured to define monitoring occasions associated with the CORESET #2 at 1404. In some aspects, a first frequency domain definition (e.g., frequencyDomainResources) may be provided for CORESETs (e.g., CORESET #1 at 1402) in half-duplex slots (e.g., under half-duplex operation) and a second frequency domain definition (e.g., frequencyDomainResources_FD) may be provided for CORESETs (e.g., CORESET #1 at 1404) in SBFD slots (e.g., under full-duplex operation). In addition, a first SS, e.g., SS1 1406, may be configured to define monitoring occasions in half-duplex slots and may be associated with the CORESET #1 at 1402. Similarly, a second SS, e.g., SS2 1408, may be configured to define monitoring occasions in the SBFD slots (e.g., D+U slots) and may be associated with the CORESET #1 at 1304. Thus, when a UE receives SS1 1406, the UE may be configured to monitor for CORESET #1 in half-duplex slots, such as CORESET #1 at 1402. When the UE receives SS2 1408, the UE may be configured to monitor for CORESET #1 in SBFD lots, such as CORESET #1 at 1404, etc.

Figure 15:
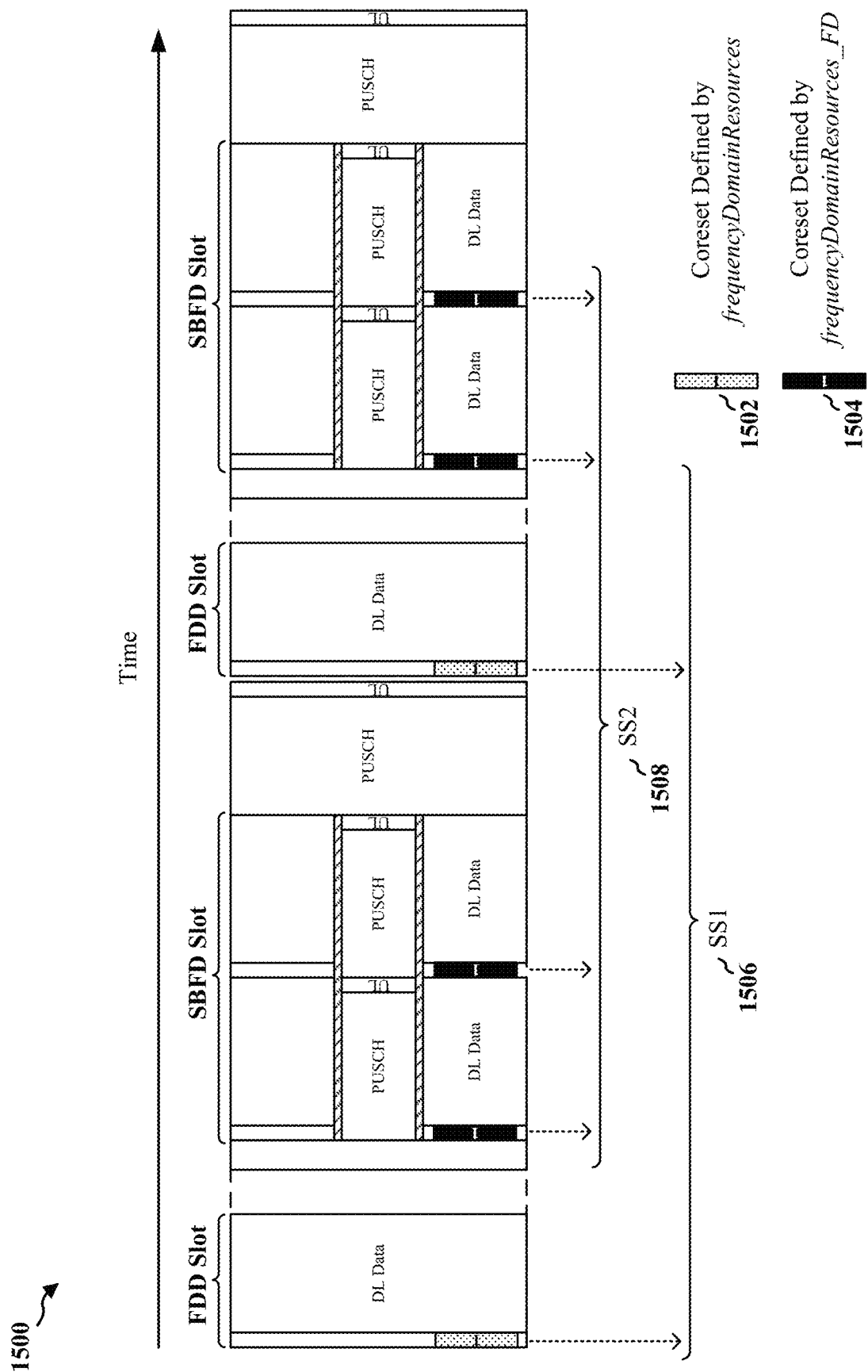
FIG. 15 is a diagram illustrating an example CORESET configuration.

FIG. 15 is a diagram 1500 illustrating an example implementation of two frequency domain definitions, where a first frequency domain definition (e.g., frequencyDomainResources) is provided for CORESETs (e.g., CORESET #1 at 1502) in half-duplex slots (e.g., under half-duplex operation) and a second frequency domain definition (e.g., frequencyDomainResources_FD) is provided for CORESETs (e.g., CORESET #1 at 1504) in SBFD slots (e.g., under full-duplex operation). In addition, a first SS, e.g., SS1 1506, may be configured to define monitoring occasions in half-duplex slots and may be associated with the CORESET #1 at 1302. Similarly, a second SS, e.g., SS2 1508, may be configured to define monitoring occasions in the SBFD slots (e.g., D+U slots) and may be associated with the CORESET #1 at 1504. Thus, when a UE receives SS1 1506, the UE may be configured to monitor for CORESET #1 in half-duplex slots, such as CORESET #1 at 1502. When the UE receives SS2 1508, the UE may be configured to monitor for CORESET #1 in SBFD lots, such as CORESET #1 at 1504, etc.

Figure 16:
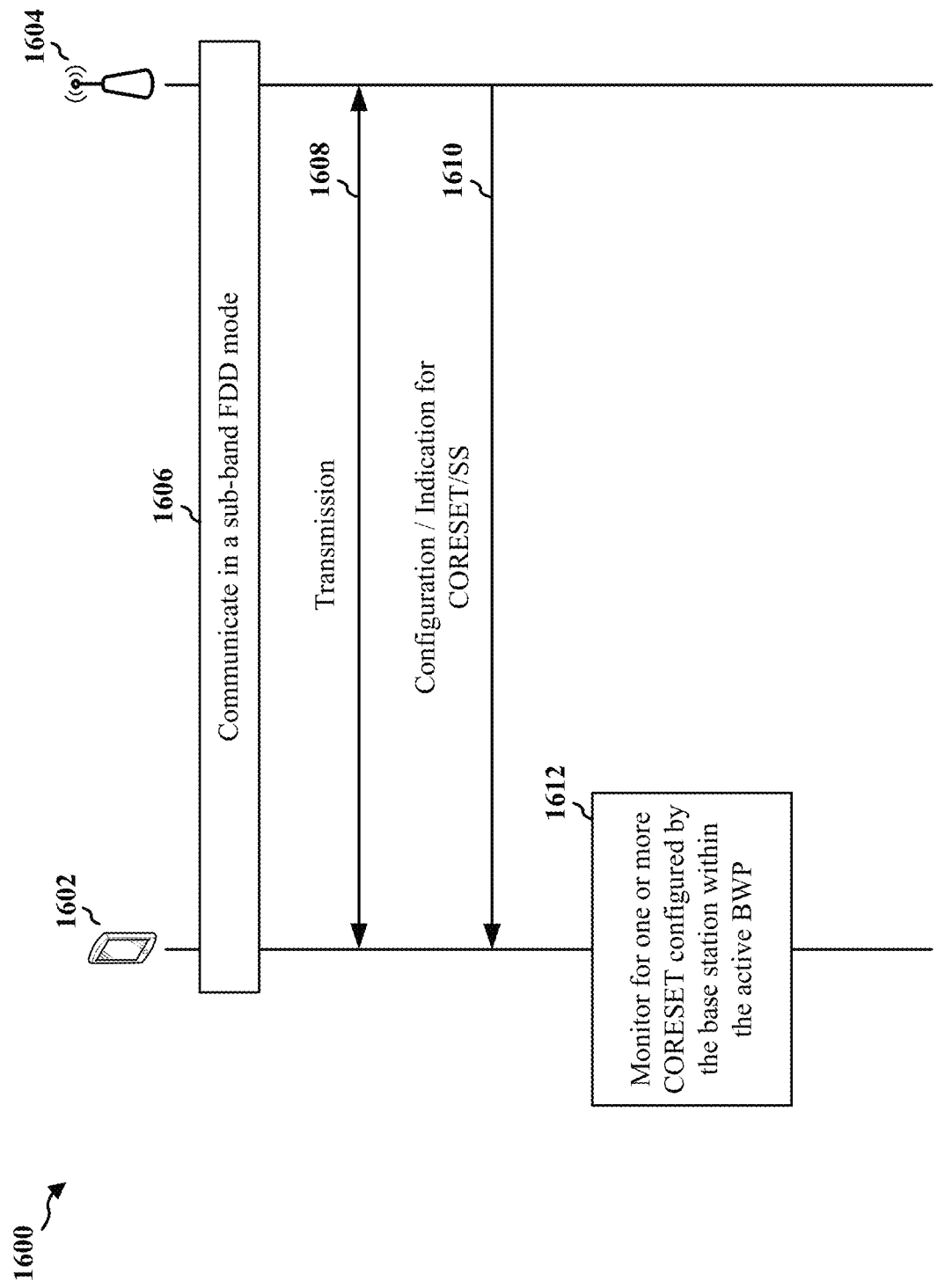
FIG. 16 is a diagram illustrating an example communication flow between a UE and a base station.

FIG. 16 is an example communication flow 1600 between a UE 1602 and a base station 1604. In some aspects, at 1606, the UE 1602 and the base station 1604 may communicate with each other in a sub-band FDD mode, such as described in connection with FIGS. 4A, 4B, 4C, 5A, and 5B. During the communication, the base station 1404 transmit/receive a downlink/uplink transmission 1608 in one or more RBWs of an active BWP. At 1610, the base station 1604 may configure the UE 1602 to monitor for one or more CORESET configured by the base station within the active BWP. Responsive to the configuration, at 1612, the UE 1602 may monitor for one or more CORESET within the active downlink BWP during monitoring occasions based on the configuration received at 1610.

In some aspects, based on the configuration at 1610, the CORESET(s) are associated with the RBWs and the UE 1602 is configured to exclude monitoring occasions for the CORESET(s) that fall partially or completely outside the active RBW. CORESET(s) to be monitored by the UE 1602 may be indicated in the active RBW in the one or more RBWs with a maximum number of CORESET(s) per BWP.

In some aspects, based on the configuration at 1610, the CORESET(s) may be associated with the BWP instead of the one or more RBWs. The interpretation of a bitmap/bit string (such as a bitmap frequencyDomainResources) may be different for each RBW. For example, in some aspects, a subset of the bitmap may be used and the bits may be mapped to each of the one or more RBWs (RBW_i) instead of the entire BWP. In some aspects, a field or an indication may be added to the information element (IE) of the SS definition. For example, a field, such as a mode field, may be added to the IE of the SS to indicate whether the bitmap associated with a BWP is to be interpreted under half-duplex mode or under full-duplex mode. When the mode field indicates half-duplex mode, the bitmap may be interpreted to map the entire BWP, whereas when the mode field indicates full-duplex mode, the bitmap may be interpreted to map the active RBW of the one or more RBWs without mapping the non-active RBWs. In other words, when an SS is defined to monitor the CORESET in an SBFD slot and under full-duplex mode, the UE may interpret the bitmap to correspond to RBs in the active RBW of the BWP. Thus, one type of SS may be used for the HD slot (e.g., under half-duplex mode) and another type of SS may be used for the D+U slot (e.g., under full-duplex mode). The UE 1602 may monitor the CORESETs based on the different interpretations and the IE.

In another set of aspects, based on the configuration at 1610, the CORESET(s) may still be associated with the BWP and instead of defining a different interpretation or configuration for the bitmap/bit string (e.g., frequencyDomainResources) of the CORESET, a list of bitmaps, such as frequencyDomainResources_RBW_i, that each defines the frequency domain resources for each of the different RBWs may be provided. A SS for the CORESET in RBW_i may monitor frequency domain resources indicated by frequencyDomainResources_RBW_i. In one example, a new field (e.g., frequencyDomainResources_RBW_i) may be used to define the RBW associated with the CORESET in an SBFD slot (e.g., D+U slot) for the communication system. Thus, for regular HD slots (e.g., under half-duplex operation), CORESETs may be defined by a first frequency domain definition (e.g., frequencyDomainResources), whereas for SBFD slots, CORESETs may be defined by a second frequency domain definition (e.g., frequencyDomainResources_RBW_i) according to the active RBW.

In some aspects, at 1606, the UE 1606 and the base station 1604 may communicate with each other in a sub-band FDD mode, such as described in connection with FIGS. 4A, 4B, 4C, 5A, and 5B. During the communication, the base station 1604 may transmit a downlink transmission 1608 in a usable BW of an active downlink BWP in a SBFD slot, such as described in connection with FIGS. 7 and 8, where the usable BW may not include frequency resources used for guard band and uplink transmission. At 1610, the base station 1604 may configure the UE to monitor for one or more CORESET configured by the base station within the active downlink BWP. In response, the UE 1602 may monitor for one or more CORESET within the active downlink BWP during monitoring occasions based on the configuration received at 1610.

In one example, the UE 1602 may determine whether the monitoring occasions for CORESET(s) fall partially or completely outside of the usable BW when the base station is operating under full-duplex mode. The UE 1602 may be configured to ignore monitoring occasions that fall partially or completely outside of the usable BW in the SBFD slot. However, the UE 1602 may continue to monitor for CORESET(s) that does not fall outside of the usable BW or intersect with non-usable BW. In addition, if the UE 1402 is configured to not monitoring for CORESET that falls partially or completely outside of the usable BW, the base station 1604 may further configure or indicate additional CORESET(s) to the UE at 1610, such as described in connection with FIG. 11. In an example, the base station 1604 may configure the UE 1602 to monitor up to four CORESETs within the active downlink BWP when the base station 1604 is operating under half-duplex mode, and may configure the UE 1602 to monitor additional CORESETs (e.g., in addition to four CORESETs) when the base station is operating under full-duplex mode. Thus, the base station 1404 may configure the UE 1602 to refrain from monitoring a certain number of CORESETs in a given slot. For the UE 1602 to determine whether to apply monitoring rule for the SBFD slot or whether the base station is operating under half-duplex mode or full duplex mode, the base station 1604 may configure the UE 1602 with one or more SS set that is associated with the one or more CORESET, where each SS set may define a monitoring occasion in the usable BW of the active downlink BWP in the SBFD slot.

In another example, the configuration at 1610 may further includes a bitmap of frequency domain resources that corresponds to a CORESET. Thus, at 1412, the UE 1602 may determine frequency resources for monitoring occasions of the CORESET based at least in part on the bitmap, and may also base on whether the UE is monitoring the CORESET in the SBFD slot or in a downlink slot (e.g., half-duplex slot), such as described in connection with FIGS. 12A and 12B. For example, the UE 1602 may determine, based on the bitmap, a first set of frequency resources within the active downlink BWP for monitoring the CORESET in the downlink slot and a second set of frequency resources within the active downlink BWP for monitoring the CORESET in the SBFD slot. When the base station 1604 is operating under full-duplex mode, a subset of the bitmap may be used where the bits of the subset may be mapped to usable BW instead of the whole BWP. In other words, the UE 1602 may apply a subset of the bitmap to resource blocks in the usable BW of the BWP. For the UE 1602 to determine whether the base station 1604 is operating under half-duplex mode or full-duplex mode, the base station 1404 may transmit an indication of the operating mode in an SS set at 1610, so that the UE 1602 may monitor for the CORESET based on the indication by mapping the bitmap to resource blocks in the active downlink BWP or a subset of the bitmap to resource blocks in the usable BW of the active downlink BWP, such as described in connection with FIGS. 12A and 12B. For example, the UE 1602 may map the bitmap to a full BWP if the indication indicates half-duplex mode for the SS set, or the UE may map a subset of the bitmap to the usable BW if the indication indicates full-duplex mode, etc.

In one other example, the configuration and/or indication may include a first bitmap of frequency domain resources for half-duplex operation and a second bitmap of frequency domain resources for full-duplex operation, where the UE 1402 may be configured to monitor the CORESET using the second bitmap of frequency domain resources during the SBFD slot (e.g., full-duplex operation), and monitor the CORESET using the first bitmap of frequency domain resources during half-duplex slot (e.g., half-duplex operation), such as described in connection with FIG. 15. For example, at 1610, the base station 1604 may also indicate to the UE 1602 about full-duplex mode for a SS set associated with the first frequency domain resources, such that the UE 1602 may monitor for the one or more CORESET using the second bitmap of frequency domain resources based on the indication of full-duplex mode for the SS set. Similarly, the base station 1604 may indicate to the UE 1602 about half-duplex mode for a SS set associated with the bitmap of the first frequency domain resources, such that the UE 1602 may monitor for the CORESET using the first bitmap of frequency domain resources in a downlink slot based on the indication of half-duplex mode for the SS set.

Figure 17:
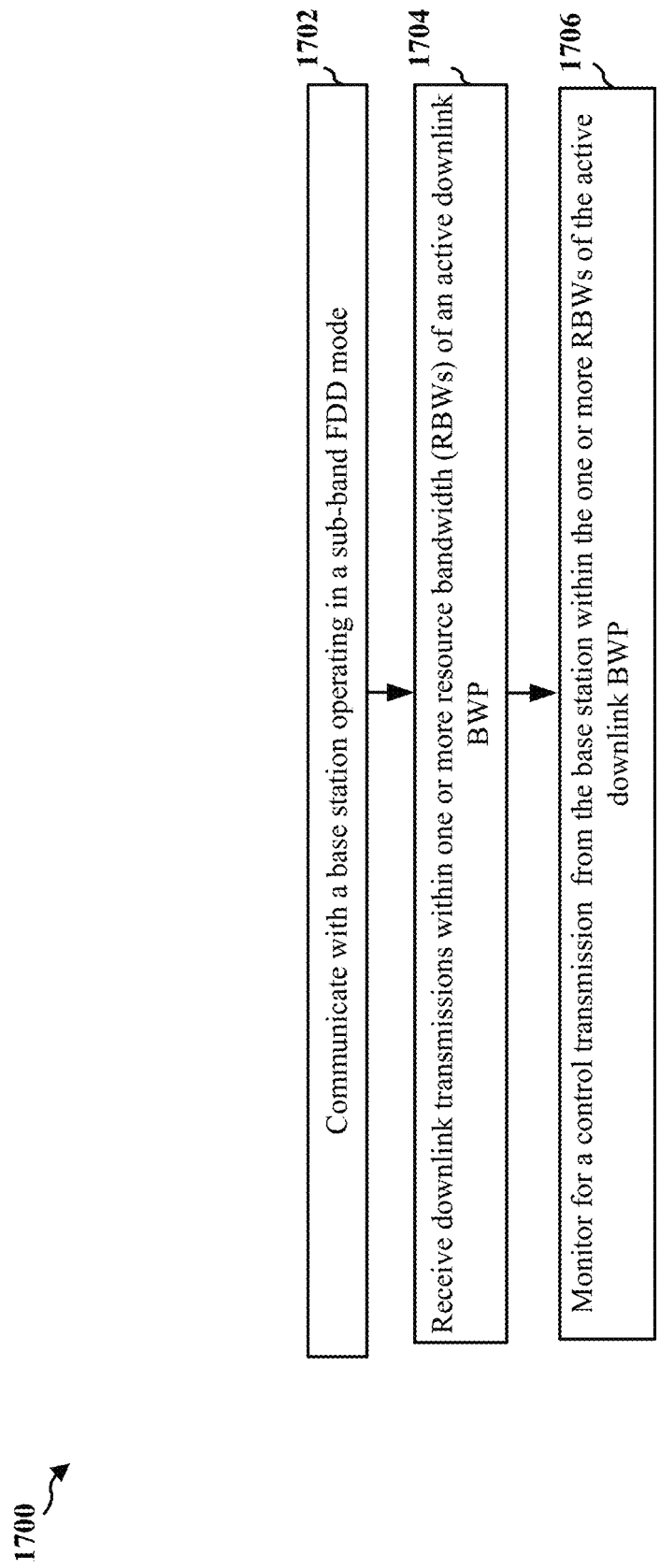
FIG. 17 is a flowchart of a method of wireless communication.

FIG. 17 is a flowchart of a method 1700 of wireless communication. The method may be performed by a UE or a component of a first UE (e.g., the UE 104, 350, apparatus 1902; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to apply different monitoring rules for CORESET.

At 1702, the UE may communicate with a base station operating in a sub-band FDD mode, such as described in connection with FIGS. 4A, 4B, 4C, 5A, and 5B, and 16. For example, the UE 1602 may communicate with the base station 1604 operating in a sub-band FDD mode. Further, 1702 may be performed by monitoring component 1940 in FIG. 19.

At 1704, the UE may receive a downlink transmission within one or more RBWs of an active downlink BWP. For example, the UE may receive a downlink transmission within one or more RBWs 706, 708, 710A, 710B of an active downlink BWP in example 700 in FIG. 7A or example 750 in FIG. 7B as described in connection with FIGS. 7A/7B-8. Further, 1704 may be performed by monitoring component 1940 in FIG. 19.

At 1706, the UE may monitor for a control transmission, such as one or more CORESET, configured by the base station within the one or more RBWs of the active downlink BWP during monitoring occasions. For example, the UE 1602 in FIG. 16 may monitor for one or more CORESET configured by the base station 1604 in FIG. 16 within the one or more RBWs of the active downlink BWP during monitoring occasions as described in connection with FIGS. 9 to 15. Further, 1706 may be performed by monitoring component 1940 in FIG. 19.

Figure 18:
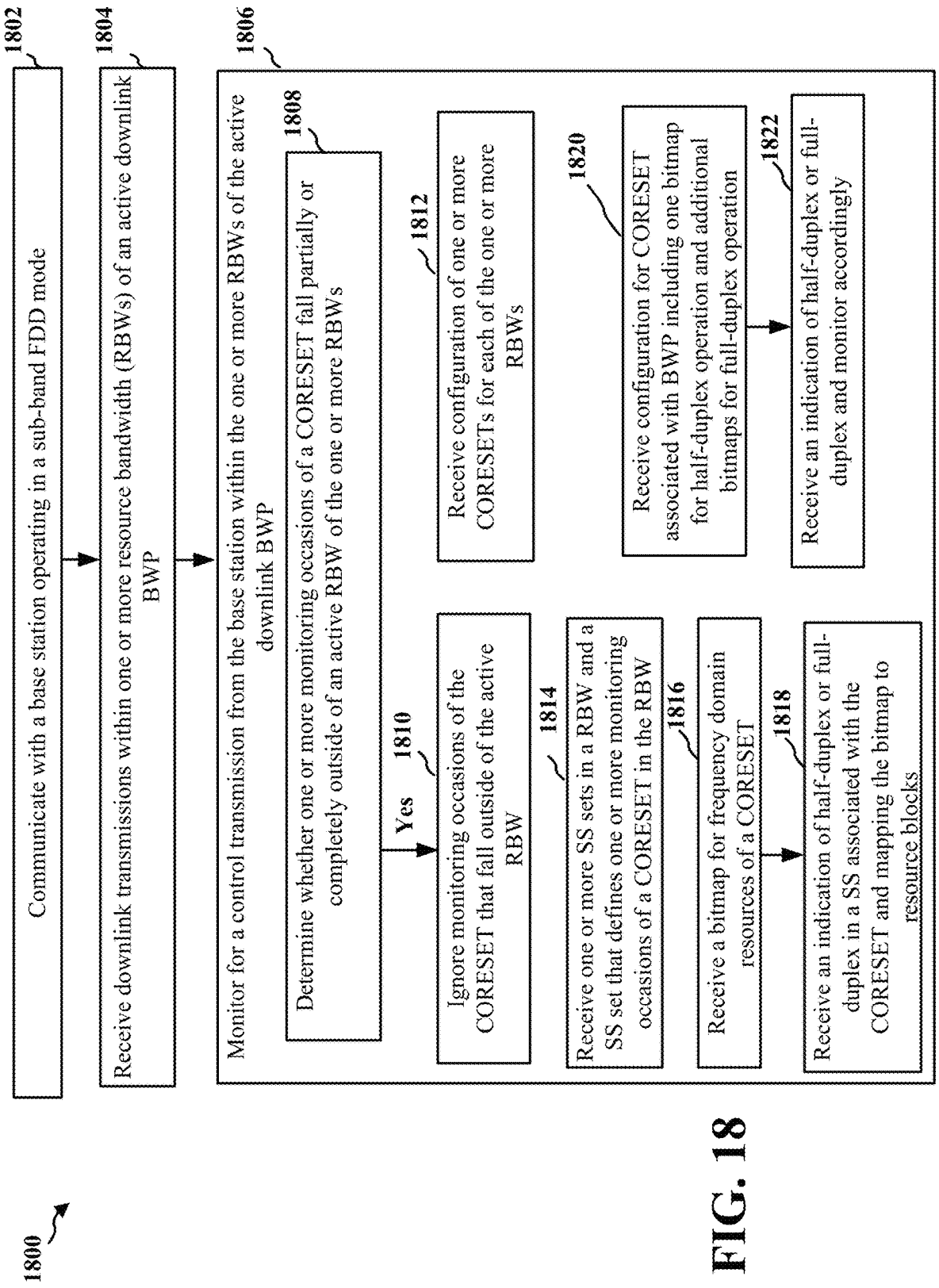
FIG. 18 is a flowchart of a method of wireless communication.

FIG. 18 is a flowchart of a method 1800 of wireless communication. The method may be performed by a UE or a component of a first UE (e.g., the UE 104, 350, apparatus 1902; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to apply different monitoring rules for CORESET.

At 1802, the UE may communicate with a base station operating in a sub-band FDD mode, such as described in connection with FIGS. 4A, 4B, 4C, 5A and 5B, and 16. For example, the UE 1602 may communicate with the base station 1604 operating in a sub-band FDD mode. Further, 1802 may be performed by monitoring component 1940 in FIG. 19. Further, 1802 may be performed by monitoring component 1940 in FIG. 19.

At 1804, the UE may receive a downlink transmission within one or more RBWs of an active downlink BWP. For example, the UE may receive a downlink transmission within one or more RBWs 706, 708, 710A, 710B of an active downlink BWP in example 700 in FIG. 7A or example 750 in FIG. 7B as described in connection with FIGS. 7A/7B-8. In some aspects, the one or more RBWs correspond with usable BW of the active BWP, the active BWP being in a SBFD slot, and the usable BW does not include frequency resources used for guard band and uplink transmission. For example, the UE may receive a downlink transmission in a usable BW 756 or 758 of an active downlink BWP in example 750 in FIG. 7B. Further, 1804 may be performed by monitoring component 1940 in FIG. 19.

At 1806, the UE may monitor for one or more CORESET configured by the base station within the one or more RBWs of the active downlink BWP during monitoring occasions. For example, the UE 1602 in FIG. 16 may monitor for one or more CORESET configured by the base station 1604 in FIG. 16 within the one or more RBWs of the active downlink BWP during monitoring occasions as described in connection with FIGS. 9 to 15. In some aspects, the one or more CORESETs may correspond with a control transmission CORESETs configured by the base station. In some aspects, the UE may monitor for the one or more CORESETs configured by the base station within the active downlink BWP during monitoring occasions. Further, 1806 may be performed by monitoring component 1940 in FIG. 19.

In some aspects, to support the monitoring at 1806, at 1812, the UE may receive a configuration of one or more CORESETs for each of the one or more RBWs. For example, the UE may receive a configuration of one or more CORESETs 1002 for each of the one or more RBWs as described in connection with FIG. 10. In some aspects, the configuration may include a bitmap of frequency domain resources that corresponds with RBs in a RBW. In some aspects, at 1814, the UE may receive configuration of one or more SS sets in a RBW and a SS set that defines monitoring occasions of a CORESET in the RBW. For example, the UE 1602 may receive configuration of one or more SS sets in a RBW and a SS set that defines monitoring occasions of a CORESET in the RBW.

As part of 1806, at 1808, the UE may determine one or more monitoring occasions of the CORESET that fall partially or completely outside of the active RBW of the one or more RBWs. For example, the UE 1602 in FIG. 16 may determine one or more monitoring occasions of the CORESET that fall partially or completely outside of the active RBW of the one or more RBWs as described in connection with FIG. 10, such as shown by the CORESET #2 at 1004 in FIG. 10.

After determining one or more monitoring occasions of the CORESET that fall partially or completely outside of the active RBW of the one or more RBWs, at 1810, the UE may ignore the one or more monitoring occasions of the CORESET that fall partially or completely outside of the active RBW of the one or more RBWs. For example, the UE may ignore the one or more monitoring occasions of the CORESET that fall partially or completely outside of the active RBW of the one or more RBWs such as shown by the CORESET #2 at 1004 as described in connection with FIG. 10.

In some aspects, to support the monitoring at 1806, at 1816, the UE may receive a bitmap for frequency domain resources of a CORESET associated with the BWP, such as described in connection with FIG. 13. For example, the UE 1602 may receive a bitmap for frequency domain resources of a CORESET associated with the BWP from the base station 1604.

To support the monitoring at 1806, in some aspects, at 1818, the UE may receive an indication of a half-duplex mode or a full-duplex mode in a SS set associated with the CORESET, such as described in connection with FIG. 13. For example, the UE 1602 may receive an indication of a half-duplex mode or a full-duplex mode in a SS set associated with the CORESET 1302/1304. The UE may monitor for the CORESET based on the indication by mapping the bitmap to resource blocks in the active BWP or a subset of the bitmap to resource blocks in the active RBW of the one or more RBWs in the BWP. For example, in some aspects, the UE determines frequency resources for the monitoring occasions of the CORESET based on the bitmap and based on whether the monitoring occasion of the CORESET is in a SBFD slot or a downlink slot, such as described in connection with FIG. 13. In some aspects, the UE may determine the frequency resources by determining, based on the bitmap, a first set of frequency resources within the active BWP for one or more monitoring occasions of the CORESET in one or more downlink slots and determining, based on the bitmap, a second set of frequency resources within the active RBW of the one or more RBWs in the active BWP for monitoring occasions of the CORESET in one or more SBFD slots. In some aspects, the UE applies a subset of the bitmap to resource blocks in a RBW of the one or more RBWs of the BWP for monitoring for the control transmission during the SBFD slot, such as described in connection with FIG. 13. In some aspects, the UE maps the bitmap to a full BWP if the indication indicates half-duplex mode for the SS set or maps a subset of the bitmap to an active RBW of the one or more RBWs in the BWP if the indication indicates full-duplex mode.

In some aspects, to support the monitoring at 1806, at 1820, the UE may receive a configuration for a CORESET associated with the BWP including one bitmap of frequency domain resources for half-duplex operation associated with the entire BWP and one or more additional bitmaps of frequency domain resources that are each associated with a RBW of the one or more RBWs for full-duplex operation each associated with one RBW in the BWP. For example, the UE 1802 may receive a configuration for a CORESET associated with the BWP including one bitmap of frequency domain resources for half-duplex operation associated with the entire BWP and one or more additional bitmaps of frequency domain resources that are each associated with a RBW of the one or more RBWs for full-duplex operation each associated with one RBW in the BWP. The UE may monitor for the control transmission from the base station using the bitmaps associated with RBWs during the SBFD slots. In some aspects, at 1822, the UE may receive an indication of a full-duplex mode for a SS set associated with the frequency domain resources for full-duplex operation. For example, the UE 1602 may receive an indication of a full-duplex mode for a SS set associated with the frequency domain resources for full-duplex operation. The UE may monitor for the control transmission from the base station using the one or more additional bitmaps that are each associated with a RBW of the one or more RBWs based on the indication of full-duplex mode for the SS set. In some aspects, at 1822, the UE may receive an indication of a half-duplex mode for a SS set associated with the bitmap of frequency domain resources in the CORESET configuration. For example, the UE 1602 may receive an indication of a half-duplex mode for a SS set associated with the bitmap of frequency domain resources in the CORESET configuration. The UE may monitor for the control transmission from the base station using the bitmap of frequency domain resources in a downlink slot based on the indication of half-duplex mode for the SS set.

Figure 19:
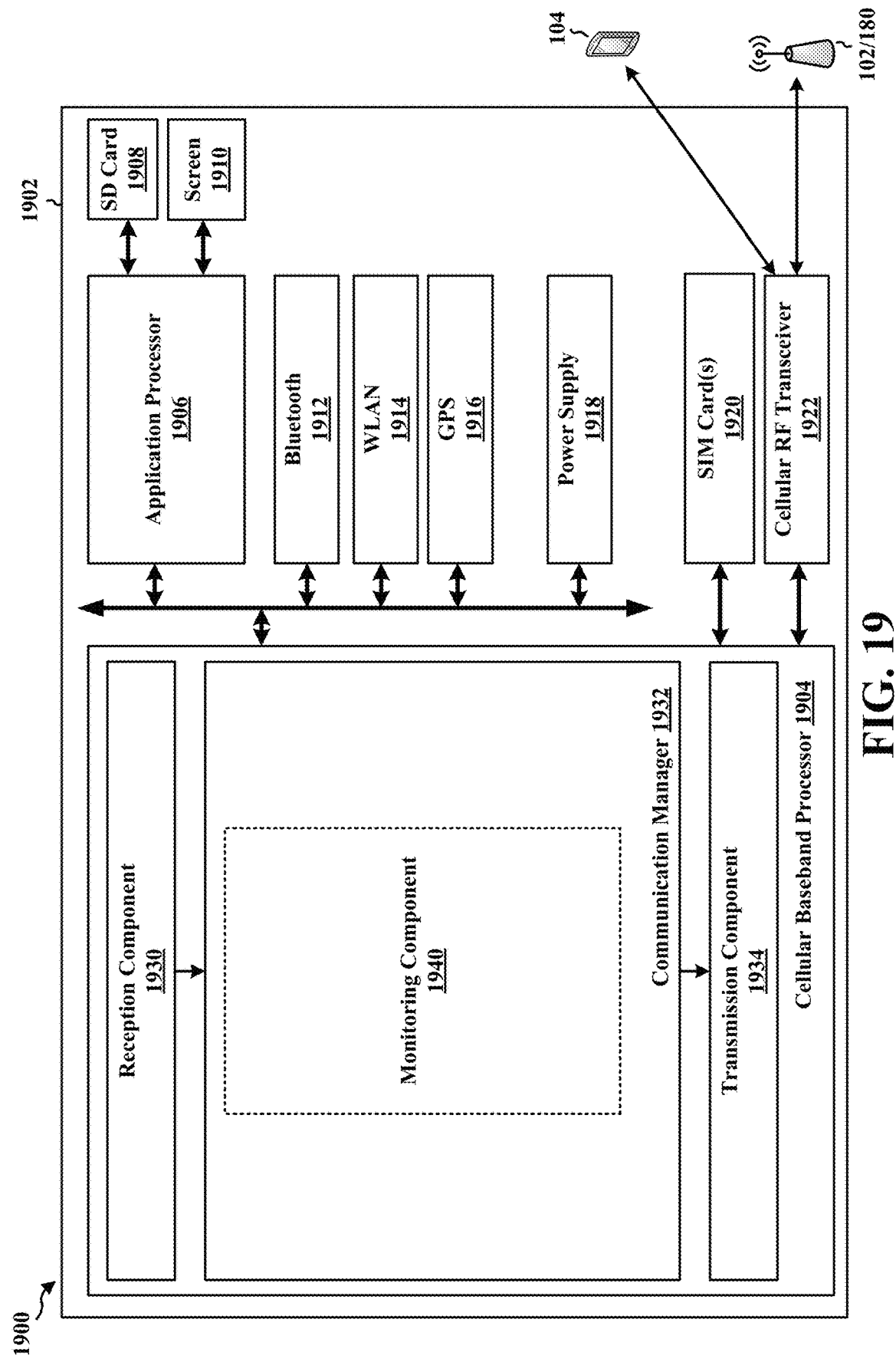
FIG. 19 is a diagram illustrating an example of a hardware implementation for an example apparatus.

FIG. 19 is a diagram 1900 illustrating an example of a hardware implementation for an apparatus 1902. The apparatus 1902 is a UE and may include a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or BS 102/180. The cellular baseband processor 1904 may include a computer-readable medium/memory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the aforediscussed additional modules of the apparatus 1902. The reception component 1930 and the transmission component 1934 may be configured to communicate with a base station operating in a sub-band FDD mode as described in connection with 1702 of FIG. 17 and 1802 of FIG. 18. The reception component 1930 may be configured to receive downlink transmissions within one or more RBWs of an active BWP as described in connection with 1704 of FIG. 17 and 1804 of FIG. 18.

The communication manager 1932 includes a monitoring component 1940 that is configured to monitor for a control transmission from the base station within the one or more RBWs of the active BWP as described in connection with 1806 of FIG. 18 and 1706 of FIG. 17.

The apparatus may include additional components that perform each of the blocks of the algorithm in the aforementioned flowcharts of FIGS. 17 and 18. As such, each block in the aforementioned flowcharts of FIGS. 17 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 1902, and in particular the cellular baseband processor 1904, includes means for communicating with a base station operating in a sub-band FDD mode; means for receiving downlink transmissions within one or more RBWs of an active BWP; and means for monitoring for a control transmission from the base station within the one or more RBWs of the active BWP.

The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
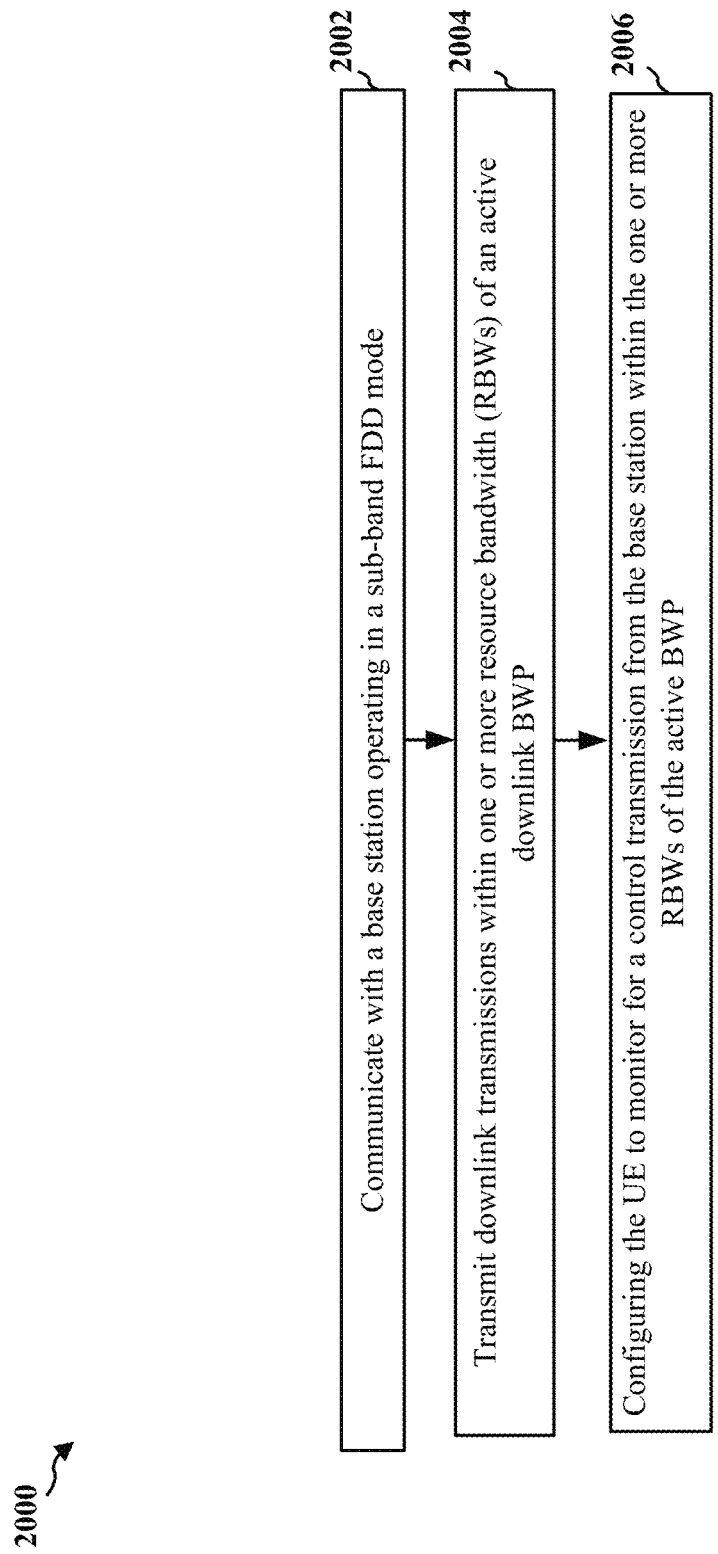
FIG. 20 is a flowchart of a method of wireless communication.

FIG. 20 is a flowchart 2000 of a method of wireless communication. The method may be performed by a base station or a component of a base station (e.g., base station 102, 180, 310, 1404; which may include the memory 376 and which may be the entire base station 310 or a component of the base station 310, such as the TX processor 316, the RX processor 370, and/or the controller/processor 375). Optional aspects are illustrated with a dashed line. The method may enable the base station to configure a UE with different CORESET monitoring rule, enable the UE to have more flexibility in monitoring the CORESET.

At 2002, the base station may communicate with a UE in a sub-band FDD mode, such as described in connection with FIGS. 4A, 4B, 4C, 5A, 5B, and 16. For example, the base station 1604 may communicate with a UE 1602 in a sub-band FDD mode. Further, 2002 may be performed by configuration component 2240 in FIG. 22.

At 2004, the base station may transmit a downlink transmission within one or more RBWs of an active downlink BWP. For example, the base station may transmit a downlink transmission within one or more RBWs of an active downlink BWP as described in connection with FIGS. 7-8. For example, the base station may transmit a downlink transmission within one or more RBWs 706, 708, 710A, 710B of an active downlink BWP in example 700 in FIG. 7A or example 750 in FIG. 7B as described in connection with FIGS. 7A/7B-8. Further, 2004 may be performed by configuration component 2240 in FIG. 22.

At 2006, the base station may configure the UE to monitor for a control transmission, such as one or more CORESET, configured by the base station within the one or more RBWs of the active downlink BWP during monitoring occasions. For example, the UE 1602 in FIG. 16 may monitor for one or more CORESET configured by the base station 1604 in FIG. 16 within the one or more RBWs of the active downlink BWP during monitoring occasions as described in connection with FIGS. 9 to 15. Further, 2006 may be performed by configuration component 2240 in FIG. 22.

Figure 21:
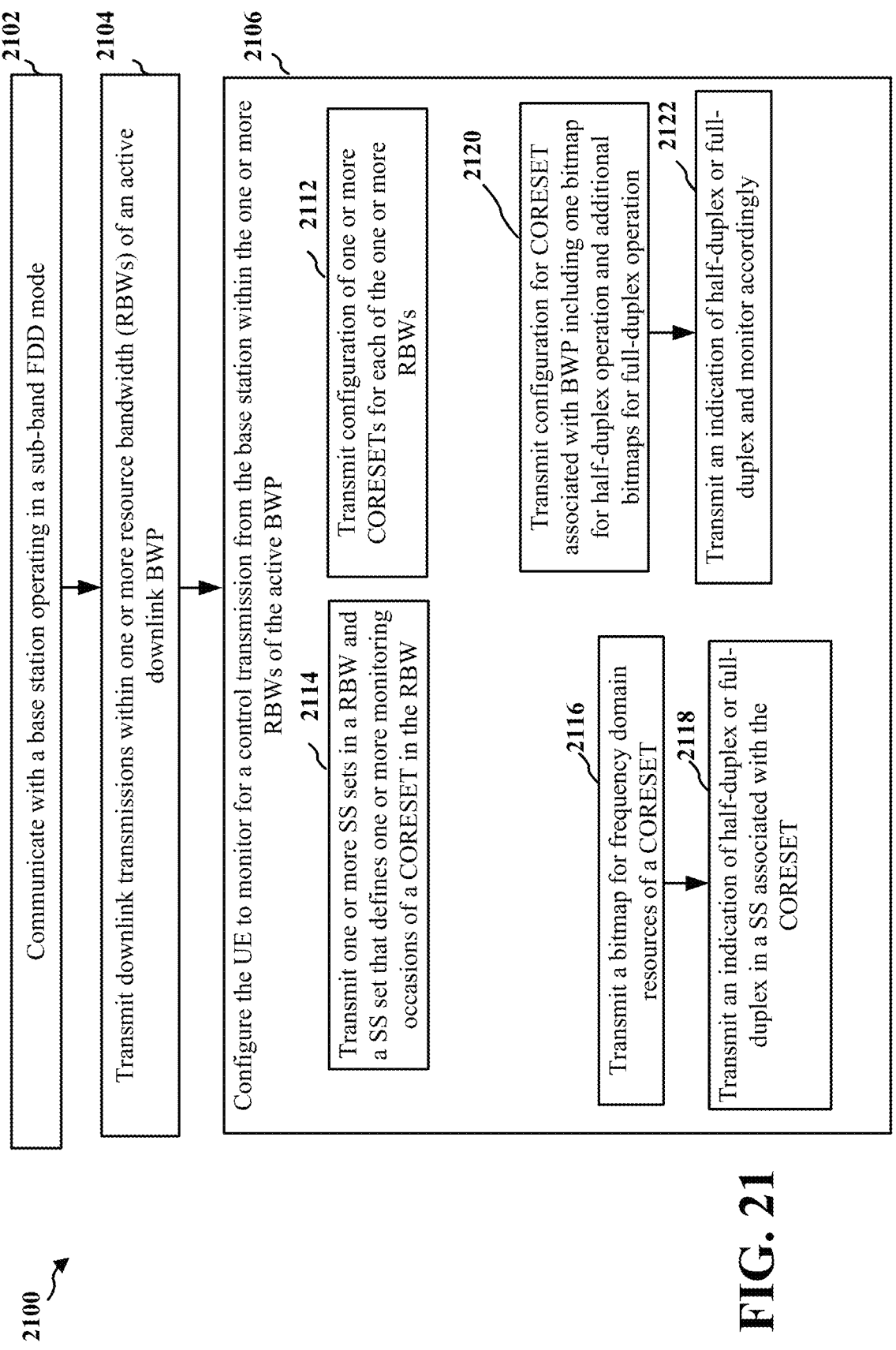
FIG. 21 is a flowchart of a method of wireless communication.

FIG. 21 is a flowchart 2100 of a method of wireless communication. The method may be performed by a base station or a component of a base station (e.g., base station 102, 180, 310, 1404; which may include the memory 376 and which may be the entire base station 310 or a component of the base station 310, such as the TX processor 316, the RX processor 370, and/or the controller/processor 375). Optional aspects are illustrated with a dashed line. The method may enable the base station to configure a UE with different CORESET monitoring rule, enable the UE to have more flexibility in monitoring the CORESET.

At 2102, the base station may communicate with a UE in a sub-band FDD mode, such as described in connection with FIGS. 4A, 4B, 4C, 5A, 5B, and 16. For example, the base station 1604 may communicate with a UE 1602 in a sub-band FDD mode. Further, 2102 may be performed by configuration component 2240 in FIG. 22.

At 2104, the base station may transmit a downlink transmission within one or more RBWs of an active downlink BWP. For example, the base station may transmit a downlink transmission within one or more RBWs of an active downlink BWP as described in connection with FIGS. 7-8. For example, the base station may transmit a downlink transmission within one or more RBWs 706, 708, 710A, 710B of an active downlink BWP in example 700 in FIG. 7A or example 750 in FIG. 7B as described in connection with FIGS. 7A/7B-8. Further, 2104 may be performed by configuration component 2240 in FIG. 22.

At 2106, the base station may configure the UE to monitor for a control transmission, such as one or more CORESET, configured by the base station within the one or more RBWs of the active downlink BWP during monitoring occasions. For example, the UE 1602 in FIG. 16 may monitor for one or more CORESET configured by the base station 1604 in FIG. 16 within the one or more RBWs of the active downlink BWP during monitoring occasions as described in connection with FIGS. 9 to 15. Further, 2106 may be performed by configuration component 2240 in FIG. 22.

In some aspects, as part of the configuration at 2106, at 2112, the base station may transmit a configuration of one or more CORESETs for each of the one or more RBWs. For example, the base station may transmit a configuration of one or more CORESETs 1002 for each of the one or more RBWs as described in connection with FIG. 10. In some aspects, the configuration may include a bitmap of one or more frequency resources that corresponds with one or more RBs in the one or more RBWs. In some aspects, at 2114, the base station may transmit configuration of one or more SS sets in a RBW and a SS set that defines monitoring occasions of a CORESET in the RBW. For example, the base station 1604 may transmit configuration of one or more SS sets in a RBW and a SS set that defines monitoring occasions of a CORESET in the RBW.

In some aspects, as part of the configuration at 2106, at 2116, the base station may transmit a bitmap for frequency domain resources of a CORESET associated with the BWP, such as described in connection with FIG. 12. For example, the base station 1604 may transmit a bitmap for frequency domain resources of a CORESET associated with the BWP. As part of the configuration at 2106, in some aspects, at 2118, the base station transmits an indication of a half-duplex mode or a full-duplex mode in a SS set associated with the CORESET, such as described in connection with FIG. 12. For example, the base station 1604 may transmit an indication of a half-duplex mode or a full-duplex mode in a SS set associated with the CORESET, such as described in connection with FIG. 12. The UE may monitor for the CORESET based on the indication by mapping the bitmap to resource blocks in the active BWP or a subset of the bitmap to resource blocks in the active RBW of the one or more RBWs in the BWP. For example, in some aspects, the UE determines frequency resources for the monitoring occasions of the CORESET based on the bitmap and based on whether the monitoring occasion of the CORESET is in a SBFD slot or a downlink slot, such as described in connection with FIG. 12. In some aspects, the UE may determine the frequency resources by determining, based on the bitmap, a first set of frequency resources within the active BWP for one or more monitoring occasions of the CORESET in one or more downlink slots and determining, based on the bitmap, a second set of frequency resources within the active RBW of the one or more RBWs in the active BWP for monitoring occasions of the CORESET in one or more SBFD slots. In some aspects, the UE applies a subset of the bitmap to resource blocks in a RBW of the one or more RBWs of the BWP for monitoring for the control transmission during the SBFD slot, such as described in connection with FIG. 12. In some aspects, the UE maps the bitmap to a full BWP if the indication indicates half-duplex mode for the SS set or maps a subset of the bitmap to an active RBW of the one or more RBWs in the BWP if the indication indicates full-duplex mode.

In some aspects, as part of the configuration at 2106, at 2120, the base station may transmit a configuration for a CORESET associated with a BWP including one bitmap of frequency domain resources for half-duplex operation associated with the entire BWP and one or more additional bitmaps of frequency domain resources that are each associated with a RBW of the one or more RBWs for full-duplex operation each associated with one RBW in the BWP. For example, The UE may monitor for the control transmission from the base station using the bitmaps associated with RBWs during the SBFD slots. In some aspects, at 2122, the base station may transmit an indication of a full-duplex mode for a SS set associated with the frequency domain resources for full-duplex operation. The UE may monitor for the control transmission from the base station using the one or more additional bitmaps that are each associated with a RBW of the one or more RBWs based on the indication of full-duplex mode for the SS set. In some aspects, at 2122, the base station may transmit an indication of a half-duplex mode for a SS set associated with the bitmap of frequency domain resources in the CORESET configuration. The UE may monitor for the control transmission from the base station using the bitmap of frequency domain resources in a downlink slot based on the indication of half-duplex mode for the SS set. For example, the base station 1604 may transmit an indication of a full-duplex mode or a half-duplex mode.

Figure 22:
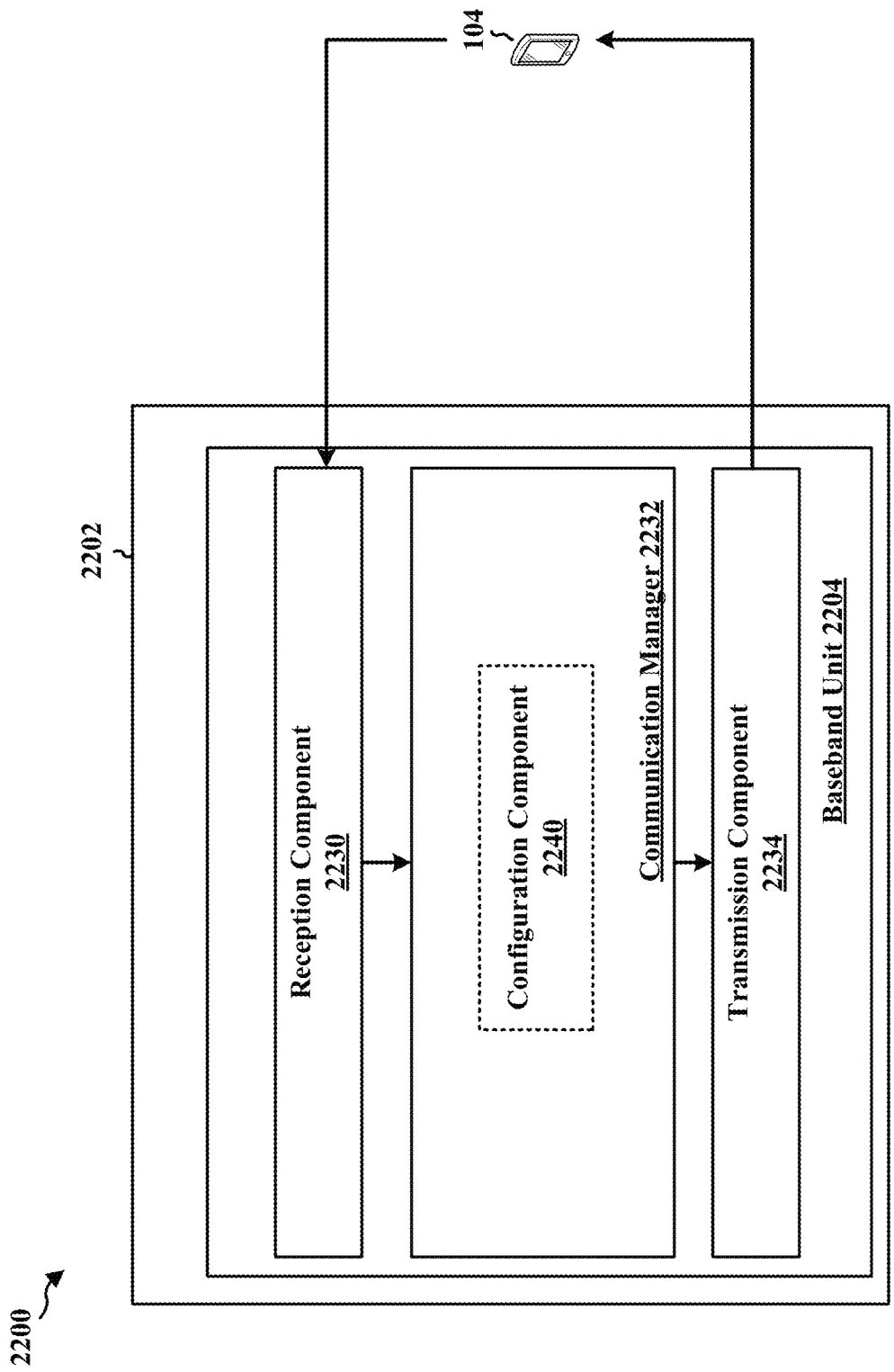
FIG. 22 is a diagram illustrating an example of a hardware implementation for an example apparatus.

FIG. 22 is a diagram 2200 illustrating an example of a hardware implementation for an apparatus 2202. The apparatus 2202 is a base station and may include a baseband unit 2204. The baseband unit 2204 may communicate through a cellular RF transceiver with the UE 104. The baseband unit 2204 may include a computer-readable medium/memory. The baseband unit 2204 is responsible for general processing, including the execution of software stored on the computer-readable medium/memory. The software, when executed by the baseband unit 2204, causes the baseband unit 2204 to perform the various functions described supra. The computer-readable medium/memory may also be used for storing data that is manipulated by the baseband unit 2204 when executing software. The baseband unit 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the baseband unit 2204. The baseband unit 2204 may be a component of the BS 310 and may include the memory 376 and/or at least one of the TX processor 316, the RX processor 370, and the controller/processor 375. The reception component 2230 and the transmission component 2234 may be configured to communicate with a UE operating in a sub-band FDD mode as described in connection with 2002 of FIG. 20 and 2102 of FIG. 21. The transmission component 2234 may be configured to transmit downlink transmissions within one or more RBWs of an active BWP as described in connection with 2004 of FIG. 20 and 2104 of FIG. 21.

The communication manager 2232 includes a configuration component 2240 that is configured to configure the UE to monitor for a control transmission from the base station within the one or more RBWs of the active BWP as described in connection with 2006 of FIG. 20 and 2106 of FIG. 21.

The apparatus may include additional components that perform each of the blocks of the algorithm in the aforementioned flowcharts of FIGS. 20 and 21. As such, each block in the aforementioned flowcharts of FIGS. 20 and 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 2202, and in particular the baseband unit 2204, includes means for communicating with a YE operating in a sub-band FDD mode; means for transmitting downlink transmissions within one or more RBWs of an active BWP; and means for configuring a UE to monitor for a control transmission from the base station within the one or more RBWs of the active BWP. The aforementioned means may be one or more of the aforementioned components of the apparatus 2202 configured to perform the functions recited by the aforementioned means. As described supra, the apparatus 2202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 23:
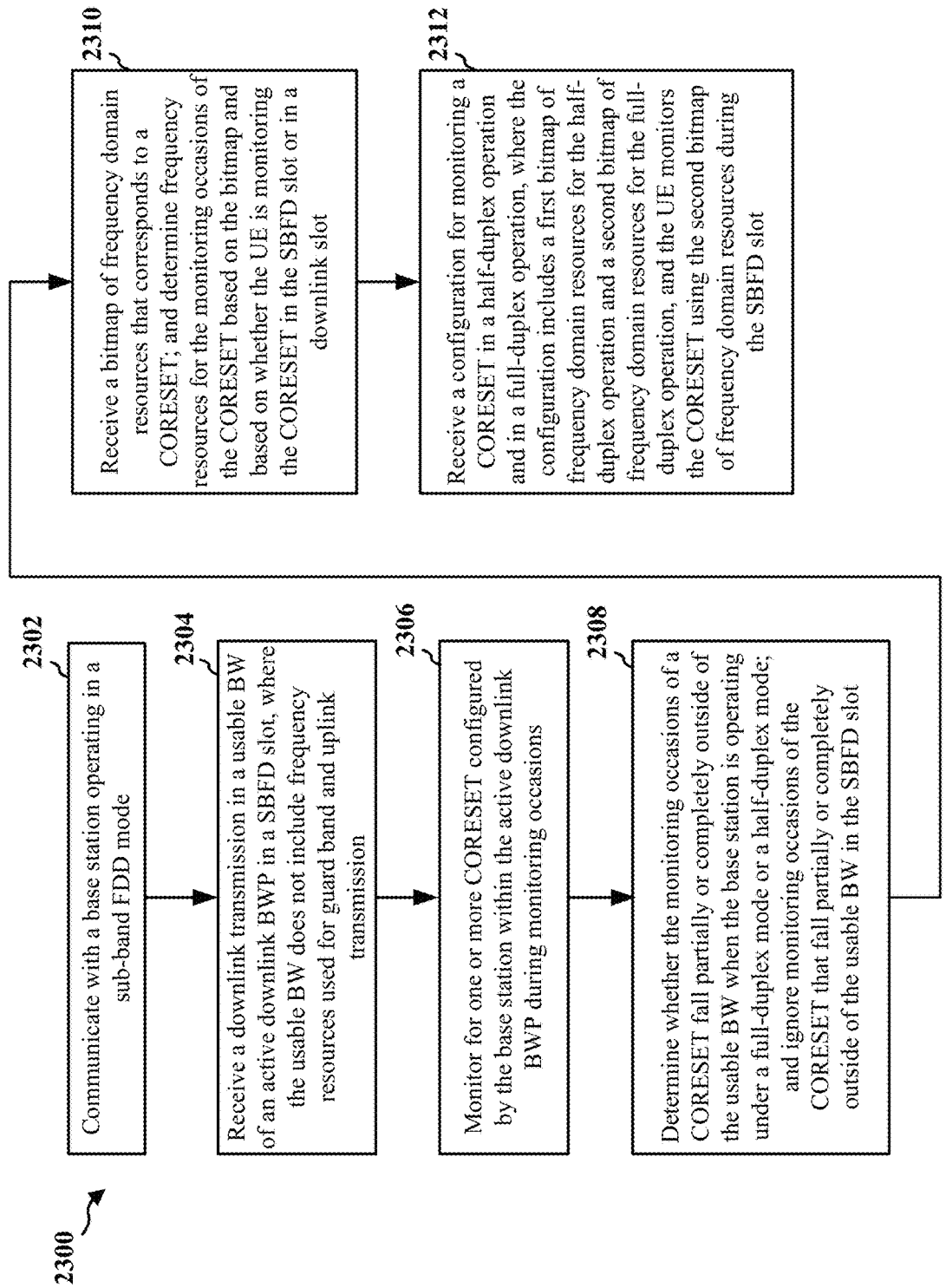
FIG. 23 is a flowchart of a method of wireless communication.

FIG. 23 is a flowchart of a method 2300 of wireless communication. The method may be performed by a UE or a component of a first UE (e.g., the UE 106, 350, 1402; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to apply different monitoring rules for CORESET based at least in part on whether the base station is operating under half-duplex mode or full-duplex mode.

At 2302, the UE may communicate with a base station operating in a sub-band FDD mode, such as described in connection with FIGS. 4A, 4B, 4C, 5A, and 5B. For example, the UE 1602 may communicate with the base station 1604 operating in a sub-band FDD mode. Further, 2302 may be performed by communication component 2440 in FIG. 24.

At 2304, the UE may receive a downlink transmission in a usable BW of an active downlink BWP in a SBFD slot, where the usable BW does not include frequency resources used for guard band and uplink transmission, such as described in connection with FIGS. 7-8. For example, the UE may receive a downlink transmission in a usable BW 756 or 758 of an active downlink BWP in example 750 in FIG. 7B. Further, 2304 may be performed by BWP component 2442 in FIG. 24.

At 2306, the UE may monitor for one or more CORESET configured by the base station within the active downlink BWP during monitoring occasions, such as described in connection with FIGS. 9 to 13. For example, the UE 1602 the UE may monitor for one or more CORESET configured by the base station 1604 within the active downlink BWP during monitoring occasions. Further, 2306 may be performed by monitoring component 2444 in FIG. 24.

At 2308, the UE may determine whether the monitoring occasions of a CORESET fall partially or completely outside of the usable BW when the base station is operating under full-duplex mode, and the UE may ignore monitoring occasions of the CORESET that fall partially or completely outside of the usable BW in the SBFD slot, such as described in connection with FIG. 10. For example, the UE may receive a configuration of one or more CORESETs 1002 for each of the one or more RBWs as described in connection with FIG. 10. The UE may also receive a configuration or an indication to monitor for additional CORESET in addition to monitoring the one or more CORESET during a downlink slot, such as described in connection with FIG. 11. For example, the configuration or the indication may configure the UE to monitor up to four CORESETs or more within the active downlink BWP or to refrain from monitoring up to certain number of CORESETs. For example, the UE may receive a configuration from the base station to monitor up to four CORESETs in the active downlink BWP when the base station is operating under half-duplex mode, and the UE may receive a configuration to monitor additional CORESETs when the base station is operating under full-duplex mode, etc. The UE may receive the configuration in a search space (SS) set, where the SS set may be associated with the one or more CORESET and may define the monitoring occasions in the usable BW. Further, 2308 may be performed by monitoring component 2444 in FIG. 24.

At 2310, the UE may receive a bitmap of frequency domain resources that corresponds to a CORESET, and the UE may determine frequency resources for the monitoring occasions of the CORESET based on the bitmap and based on whether the UE is monitoring the CORESET in the SBFD slot or in a downlink slot, such as described in connection with FIGS. 12A and 12B. For example, based on the bitmap, the UE may determine a first set of frequency resources within the active downlink BWP for monitoring the CORESET in the downlink slot, and the UE may also determine a second set of frequency resources within the active downlink BWP for monitoring the CORESET in the SBFD slot. The UE may then apply a subset of the bitmap to resource blocks in the usable BW of the BWP, such as described in connection with FIG. 12B. The UE may receive an indication of a half-duplex mode or a full-duplex mode in a search space (SS) set, where the UE may monitor the CORESET based on the indication by mapping the bitmap to resource blocks in the active downlink BWP or a subset of the bitmap to resource blocks in the usable BW of the active downlink BWP. For example, the UE may map the bitmap to a full BWP if the indication indicates half-duplex mode for the SS set or maps a subset of the bitmap to the usable BW if the indication indicates full-duplex mode, etc. Further, 2310 may be performed by monitoring component 2444 in FIG. 24.

At 2312, the UE may receive a configuration for monitoring a CORESET in a half-duplex operation and in a full-duplex operation. For example, the UE 1602 may receive a configuration for monitoring a CORESET in a half-duplex operation and in a full-duplex operation. The configuration may include a first bitmap of frequency domain resources for half-duplex operation and a second bitmap of frequency domain resources for full-duplex operation, and the UE may monitor the CORESET using the second bitmap of frequency domain resources during the SBFD slot, such as described in connection with FIG. 13. For example, the UE may receive an indication of a full-duplex mode for a SS set associated with the first frequency domain resources, where the UE may be configured to monitor for one or more CORESET using the second bitmap of frequency domain resources based on the indication of full-duplex mode for the SS set. The UE may receive an indication of a half-duplex mode for a SS set associated with the bitmap of the first frequency domain resources, where the UE may monitor for the one or more CORESET using the first bitmap of frequency domain resources in a downlink slot based on the indication of half-duplex mode for the SS set. Further, 2312 may be performed by monitoring component 2444 in FIG. 24.

Figure 24:
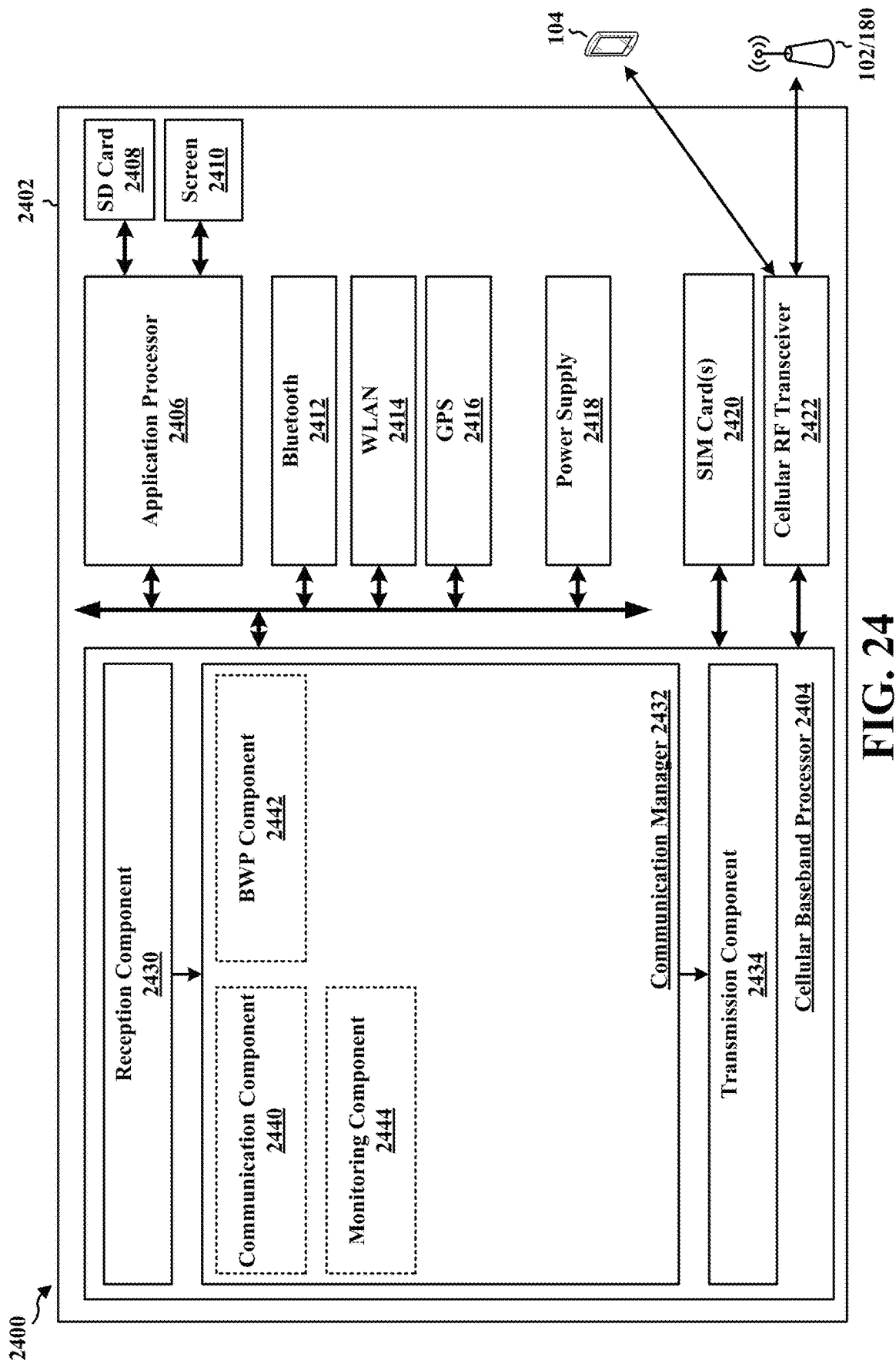
FIG. 24 is a diagram illustrating an example of a hardware implementation for an example apparatus.

FIG. 24 is a diagram 2400 illustrating an example of a hardware implementation for an apparatus 2402. The apparatus 2402 is a UE and may include a cellular baseband processor 2404 (also referred to as a modem) coupled to a cellular RF transceiver 2422 and one or more subscriber identity modules (SIM) cards 2420, an application processor 2406 coupled to a secure digital (SD) card 2408 and a screen 2410, a Bluetooth module 2412, a wireless local area network (WLAN) module 2414, a Global Positioning System (GPS) module 2416, and a power supply 2418. The cellular baseband processor 2404 communicates through the cellular RF transceiver 2422 with the UE 104 and/or BS 102/180. The cellular baseband processor 2404 may include a computer-readable medium/memory. The cellular baseband processor 2404 is responsible for general processing, including the execution of software stored on the computer-readable medium/memory. The software, when executed by the cellular baseband processor 2404, causes the cellular baseband processor 2404 to perform the various functions described supra. The computer-readable medium/memory may also be used for storing data that is manipulated by the cellular baseband processor 2404 when executing software. The cellular baseband processor 2404 further includes a reception component 2430, a communication manager 2432, and a transmission component 2434. The communication manager 2432 includes the one or more illustrated components. The components within the communication manager 2432 may be stored in the computer-readable medium/memory and/or configured as hardware within the cellular baseband processor 2404. The cellular baseband processor 2404 may be a component of the UE 350 and may include the memory 360 and/or at least one of the TX processor 368, the RX processor 356, and the controller/processor 359. In one configuration, the apparatus 2402 may be a modem chip and include just the baseband processor 2404, and in another configuration, the apparatus 2402 may be the entire UE (e.g., see 350 of FIG. 3) and include the aforediscussed additional modules of the apparatus 2402.

The communication manager 2432 includes a communication component 2440 that is configured to communicate with a base station operating in a sub-band FDD mode, e.g., as described in connection with 2302 of FIG. 23. The communication manager 2432 further includes a BWP component 2442 that is configured to receive a downlink transmission in a usable BW of an active downlink BWP in a SBFD slot, where the usable BW does not include frequency resources used for guard band and uplink transmission, e.g., as described in connection with 2304 of FIG. 23. The communication manager 2432 further includes a monitoring component 2444 that is configured to monitor for one or more CORESET configured by the base station within the active downlink BWP during monitoring occasions, e.g., as described in connection with 2306 of FIG. 23.

The apparatus may include additional components that perform each of the blocks of the algorithm in the aforementioned flowchart of FIG. 23. As such, each block in the aforementioned flowchart of FIG. 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 2402, and in particular the cellular baseband processor 2404, includes means for communicating with a base station operating in a sub-band FDD mode; means for receiving a downlink transmission in a usable BW of an active downlink BWP in a SBFD slot, where the usable BW does not include frequency resources used for guard band and uplink transmission; and means for monitoring for one or more CORESET configured by the base station within the active downlink BWP during monitoring occasions. The aforementioned means may be one or more of the aforementioned components of the apparatus 2402 configured to perform the functions recited by the aforementioned means. As described supra, the apparatus 2402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 25:
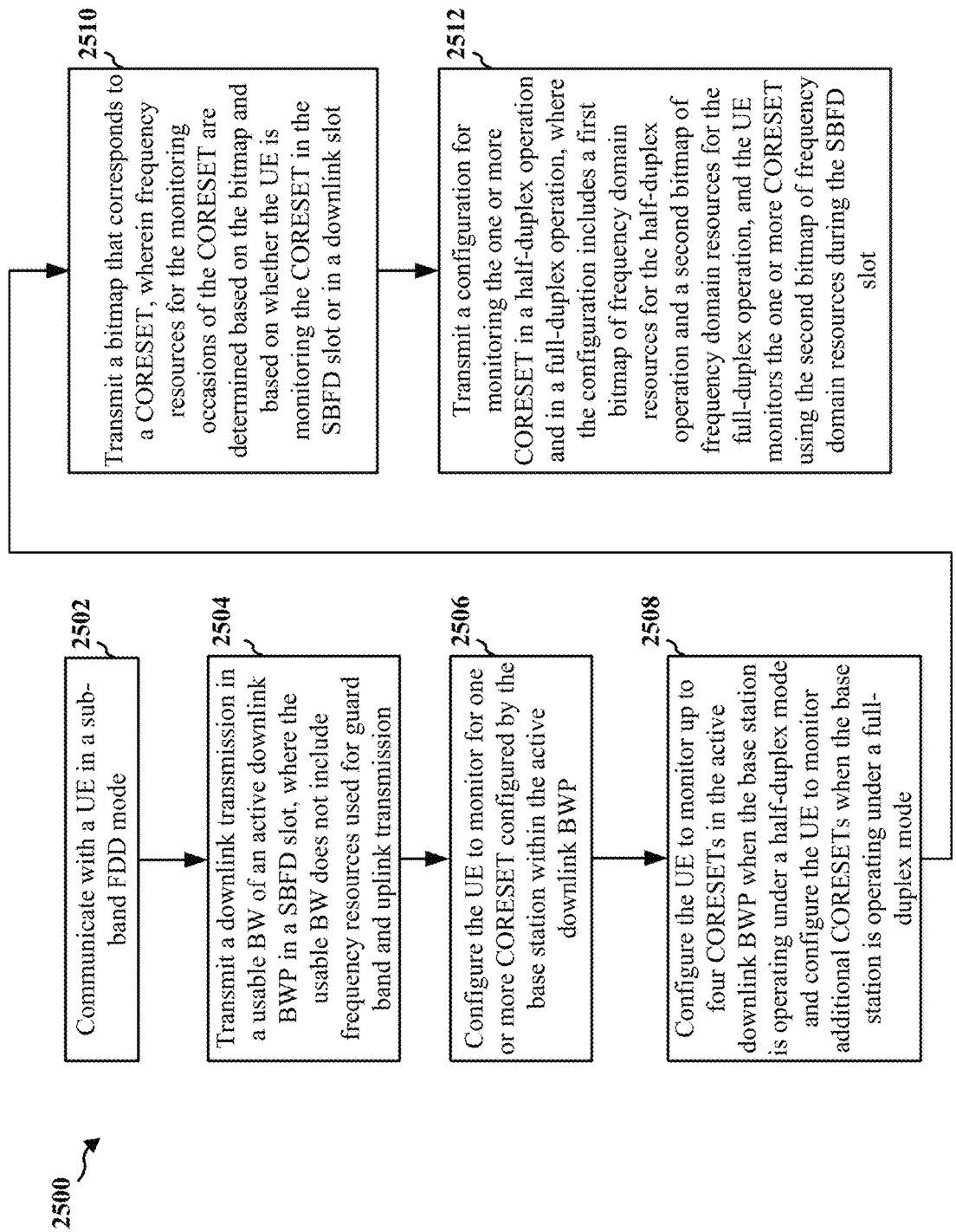
FIG. 25 is a flowchart of a method of wireless communication.

FIG. 25 is a flowchart 2500 of a method of wireless communication. The method may be performed by a base station or a component of a base station (e.g., base station 102, 260, 310, 1404; which may include the memory 376 and which may be the entire base station 310 or a component of the base station 310, such as the TX processor 316, the RX processor 370, and/or the controller/processor 375). Optional aspects are illustrated with a dashed line. The method may enable the base station to configure a UE with different CORESET monitoring rule, enable the UE to have more flexibility in monitoring the CORESET.

At 2502, the base station may communicate with a UE in a sub-band FDD mode, such as described in connection with FIGS. 4A, 4B, 4C, 5A, and 5B. For example, the base station 1604 may communicate with a UE 1602 in a sub-band FDD mode. Further, 2502 may be performed by communication component 2640 in FIG. 26.

At 2504, the base station may transmit a downlink transmission in a usable BW of an active downlink BWP in a SBFD slot, where the usable BW may not include frequency resources used for guard band and uplink transmission, such as described in connection with FIGS. 7 and 8. For example, the base station 1604 may transmit a downlink transmission in a usable BW 756 or 758 of an active downlink BWP in example 750 in FIG. 7B. Further, 2504 may be performed by BWP component 2642 in FIG. 26.

At 2506, the base station may configure the UE to monitor for one or more CORESET configured by the base station within the active downlink BWP during monitoring occasions, such as described in connection with FIGS. 8 to 13. For example, the base station 1604 may configure the UE 1602 to monitor for one or more CORESET configured by the base station within the active downlink BWP during monitoring occasions. Further, 2506 may be performed by monitoring component 2644 in FIG. 26.

At 2508, the base station may configure the UE to monitor up to four CORESETs in the active downlink BWP when the base station is operating under a half-duplex mode and the base station may configure the UE to monitor additional CORESETs when the base station is operating under a full-duplex mode, such as described in connection with FIG. 11. For example, the base station may configure up to four or more CORESETs for the UE when the base station is operating under full-duplex mode, this may compensate the UE for being unable to monitor CORESET(s) that falls partially or completely outside of the usable BW in an SBFD slot. The base station may configure the UE through SS sets, where the SS sets may be associated with the CORESET(s), such that the UE does not monitor more than a given number of CORESETs (e.g., four) in a downlink slot or a SBFD slot. Further, 2508 may be performed by monitoring component 2644 in FIG. 26.

At 2510, the base station may transmit a bitmap that corresponds to a CORESET, where frequency resources for the monitoring occasions of the CORESET are determined based on the bitmap and based on whether the UE is monitoring the CORESET in the SBFD slot or in a downlink slot, such as described in connection with FIGS. 12A and 12B. For example, the base station may transmit an indication of a half-duplex mode or a full-duplex mode for a SS set, where the bitmap 1202 or a subset of the bitmap is mapped to resource blocks in the active downlink BWP or in the usable BW of the active downlink BWP. Further, 2510 may be performed by monitoring component 2644 in FIG. 26.

At 2512, the base station may transmit a configuration for monitoring the one or more CORESET in a half-duplex operation and in a full-duplex operation, where the configuration includes a first bitmap of frequency domain resources for half-duplex operation and a second bitmap of frequency domain resources for full-duplex operation, and the UE monitors the CORESET using the second bitmap of frequency domain resources during the SBFD slot, such as described in connection with FIG. 15. For example, the base station may transmit a configuration for a SS set associated with the one or more CORESET, where the configuration may indicate a full-duplex mode to associate the SS set with a first frequency domain resources bitmap. The configuration may further indicate a half-duplex mode to associate the SS set with a second frequency domain resources bitmap, such as described in connection with FIG. 15. Further, 2512 may be performed by monitoring component 2644 in FIG. 26.

Figure 26:
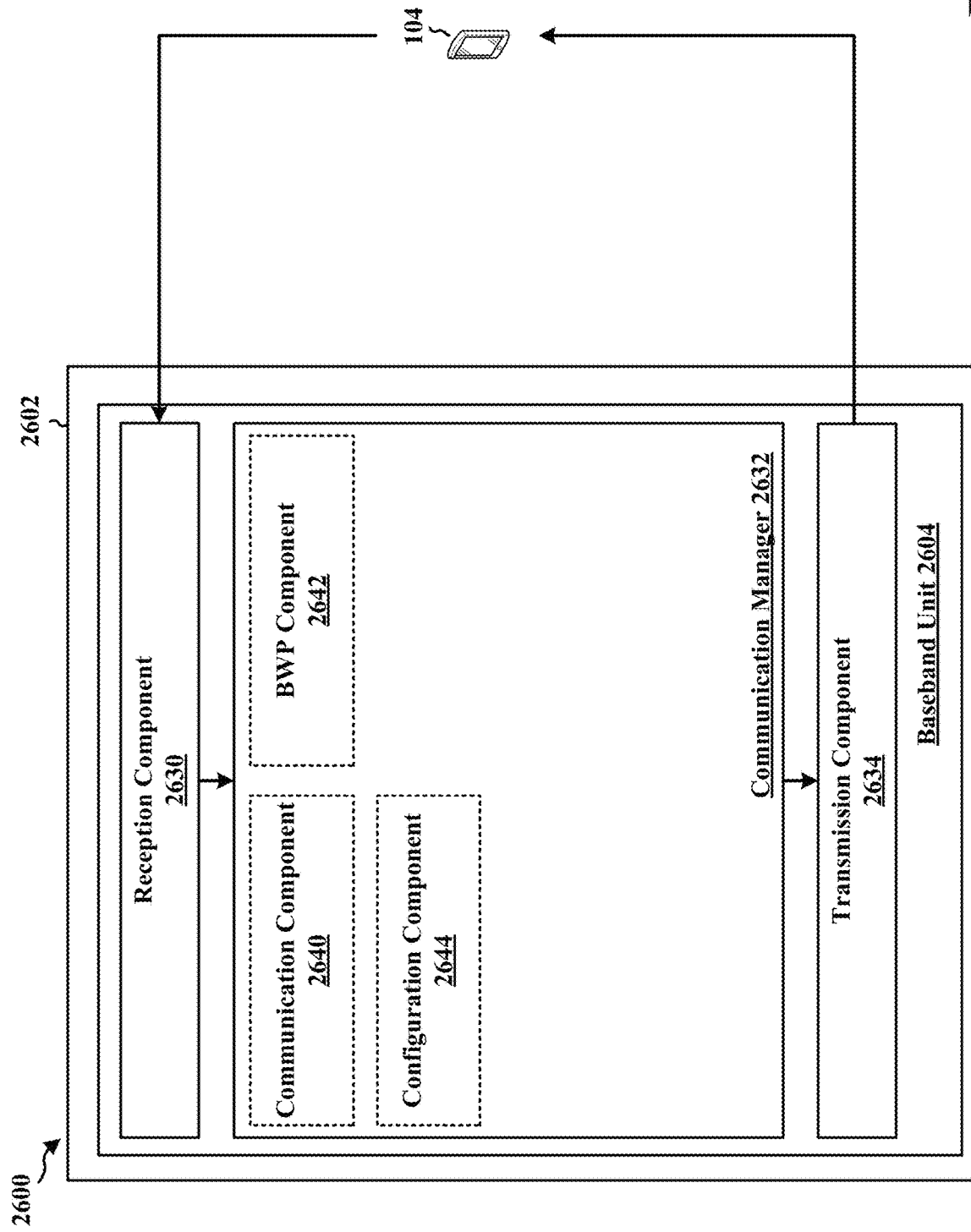
FIG. 26 is a diagram illustrating an example of a hardware implementation for an example apparatus.

FIG. 26 is a diagram 2600 illustrating an example of a hardware implementation for an apparatus 2602. The apparatus 2602 is a base station and may include a baseband unit 2604. The baseband unit 2604 may communicate through a cellular RF transceiver with the UE 104. The baseband unit 2604 may include a computer-readable medium/memory. The baseband unit 2604 is responsible for general processing, including the execution of software stored on the computer-readable medium/memory. The software, when executed by the baseband unit 2604, causes the baseband unit 2604 to perform the various functions described supra. The computer-readable medium/memory may also be used for storing data that is manipulated by the baseband unit 2604 when executing software. The baseband unit 2604 further includes a reception component 2630, a communication manager 2632, and a transmission component 2634. The communication manager 2632 includes the one or more illustrated components. The components within the communication manager 2632 may be stored in the computer-readable medium/memory and/or configured as hardware within the baseband unit 2604. The baseband unit 2604 may be a component of the BS 310 and may include the memory 376 and/or at least one of the TX processor 316, the RX processor 370, and the controller/processor 375.

The communication manager 2632 includes a communication component 2640 that is configured to communicate with a UE in a sub-band FDD mode, e.g., as described in connection with 2502 of FIG. 25. The communication manager 2632 further includes a BWP component 2642 that is configured to transmit a downlink transmission in a usable BW of an active downlink BWP in a SBFD slot, where the usable BW does not include frequency resources used for guard band and uplink transmission, e.g., as described in connection with 2504 of FIG. 25. The communication manager 2632 further includes a configuration component 2644 that is configured to configure the UE to monitor for one or more CORESET configured by the base station within the active downlink BWP during monitoring occasions, e.g., as described in connection with 2506 of FIG. 25.

The apparatus may include additional components that perform each of the blocks of the algorithm in the aforementioned flowchart of FIG. 25. As such, each block in the aforementioned flowchart of FIG. 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 2602, and in particular the baseband unit 2604, includes means for communicating with a UE in a sub-band FDD mode; means for transmitting a downlink transmission in a usable BW of an active downlink BWP in a SBFD slot, where the usable BW does not include frequency resources used for guard band and uplink transmission; and means for configuring the UE to monitor for one or more CORESET configured by the base station within the active downlink BWP during monitoring occasions. The aforementioned means may be one or more of the aforementioned components of the apparatus 2602 configured to perform the functions recited by the aforementioned means. As described supra, the apparatus 2602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: communicate with a base station operating in a sub-band FDD mode; receive downlink transmissions within one or more RBWs of an active BWP; and monitor for a control transmission from the base station within the one or more RBWs of the active BWP.

Aspect 2 is the apparatus of aspect 1, wherein the one or more RBWs correspond with usable BW of the active BWP, the active BWP being in a SBFD slot, and wherein the usable BW does not include frequency resources used for guard band and uplink transmission.

Aspect 3 is the apparatus of any of aspects 1-2, wherein the control transmission corresponds to one or more CORESETs configured by the base station.

Aspect 4 is the apparatus of any of aspects 1-3, wherein to monitor for the control transmission from the base station within the one or more RBWs of the active BWP, the at least one processor coupled to the memory is further configured to: monitor for the one or more CORESETs configured by the base station within the active downlink BWP during monitoring occasions.

Aspect 5 is the apparatus of any of aspects 1-4, wherein the at least one processor coupled to the memory is further configured to: receive a configuration from the base station to monitor up to four CORESETs in the active downlink BWP when the base station is operating under a half-duplex mode and the configuration to monitor additional CORESETs when the base station is operating under the FDD mode.

Aspect 6 is the apparatus of any of aspects 1-5, wherein the at least one processor coupled to the memory is further configured to: refrain from monitoring more than four CORESETs in a given slot.

Aspect 7 is the apparatus of any of aspects 1-6, wherein the at least one processor coupled to the memory is further configured to: receive a configuration of one or more CORESETs for each of the one or more RBWs; determine one or more monitoring occasions of the CORESET that fall partially or completely outside of an active RBW of the one or more RBWs; and ignore the one or more monitoring occasions of the CORESET that fall partially or completely outside of the active RBW of the one or more RBWs.

Aspect 8 is the apparatus of any of aspects 1-7, wherein the configuration comprises a bitmap of frequency domain resources that corresponds to RB in the RBW.

Aspect 9 is the apparatus of any of aspects 1-8, wherein the UE receives search space configurations of one or more SS sets in a RBW and a SS set that defines monitoring occasions of a CORESET in the RBW.

Aspect 10 is the apparatus of any of aspects 1-9, wherein the at least one processor coupled to the memory is further configured to: receive a bitmap for frequency domain resources of a CORESET associated with the active BWP; and determine frequency resources for a monitoring occasion of the CORESET based on the bitmap and based on whether the monitoring occasion of the CORESET is in a SBFD slot or in a downlink slot.

Aspect 11 is the apparatus of any of aspects 1-10, wherein to determine the frequency resources, the at least one processor coupled to the memory is further configured to: determine, based on the bitmap, a first set of frequency resources within the active BWP for one or more monitoring occasions of the CORESET in one or more downlink slots; and determine, based on the bitmap, a second set of frequency resources within an active RBW of the one or more RBWs in the active BWP for monitoring occasions of the CORESET in one or more SBFD slots.

Aspect 12 is the apparatus of any of aspects 1-11, wherein the UE applies a subset of the bitmap to resource blocks in the active RBW of the one or more RBWs of the BWP for monitoring for the control transmission during the SBFD slot.

Aspect 13 is the apparatus of any of aspects 1-12, wherein the at least one processor coupled to the memory is further configured to: receive an indication of a half-duplex mode or a full-duplex mode in a SS set associated with the CORESET, wherein the UE monitors for the CORESET based on the indication by mapping the bitmap to resource blocks in the active BWP or a subset of the bitmap to resource blocks in the active RBW of the one or more RBWs in the BWP.

Aspect 14 is the apparatus of any of aspects 1-13, wherein the UE maps the bitmap to a full BWP if the indication indicates the half-duplex mode for the SS set or maps a subset of the bitmap to an active RBW of the one or more RBWs in the BWP if the indication indicates the full-duplex mode.

Aspect 15 is the apparatus of any of aspects 1-14, wherein the at least one processor coupled to the memory is further configured to: receive a configuration for a CORESET associated with the active BWP including one bitmap of frequency domain resources for a half-duplex mode that is associated with the BWP and one or more additional bitmaps of frequency domain resources for a full-duplex mode each associated with one RBW in the BWP, wherein the UE monitors for the control transmission from the base station using the bitmaps associated with the one or more RBWs during one or more SBFD slots.

Aspect 16 is the apparatus of any of aspects 1-15, wherein the at least one processor coupled to the memory is further configured to: receive an indication of a full-duplex mode for a SS set associated with the frequency domain resources for full-duplex operation, wherein the UE monitors for the control transmission from the base station using the one or more additional bitmaps based on the indication of the full-duplex mode for the SS set and the active RBW for monitoring occasions in one or more SBFD slots.

Aspect 17 is the apparatus of any of aspects 1-16, wherein the at least one processor coupled to the memory is further configured to: receive an indication of a half-duplex mode for a SS set associated with the bitmap of frequency domain resources in the CORESET configuration, wherein the UE monitors for the control transmission from the base station using the bitmap of frequency domain resources in a downlink slot based on the indication of the half-duplex mode for the SS set.

Aspect 18 is the apparatus of any of aspects 1-17, further comprising a transceiver coupled to the at least one processor.

Aspect 19 is an apparatus for wireless communication at a BS, comprising: a memory; and at least one processor coupled to the memory and configured to: communicate with a UE while operating in a sub-band FDD mode; transmit downlink transmissions within one or more RBWs of an active BWP; and configure the UE to monitor for a control transmission from the base station within the one or more RBWs of the active BWP.

Aspect 20 is the apparatus of aspect 19, wherein the one or more RBWs correspond with usable BW of the active BWP, the active BWP being in a SBFD slot, and wherein the usable BW does not include frequency resources used for guard band and uplink transmission.

Aspect 21 is the apparatus of any of aspects 19-20, wherein the at least one processor coupled to the memory is further configured to: transmit a configuration of one or more CORESETs for each of the one or more RBWs.

Aspect 22 is the apparatus of any of aspects 19-21, wherein the configuration comprises a bitmap of frequency domain resources that corresponds to RB in a RBW.

Aspect 23 is the apparatus of any of aspects 19-22, wherein the base station transmits a search space configuration of one or more SS sets in a RBW and a SS set that defines monitoring occasions of a CORESET in the RBW.

Aspect 24 is the apparatus of any of aspects 19-23, wherein the at least one processor coupled to the memory is further configured to: transmit the bitmap for frequency domain resources of a CORESET associated with the BWP.

Aspect 25 is the apparatus of any of aspects 19-24, wherein the at least one processor coupled to the memory is further configured to: transmit an indication of a half-duplex mode or a full-duplex mode in a SS set associated with the CORESET, wherein the UE monitors for the CORESET based on the indication by mapping the bitmap to resource blocks in the active BWP or a subset of the bitmap to resource blocks in the active RBW of the one or more RBWs in the BWP.

Aspect 26 is the apparatus of any of aspects 19-25, wherein the at least one processor coupled to the memory is further configured to: transmit a configuration for a CORESET associated with the active BWP including one bitmap of frequency domain resources for a half-duplex mode and one or more additional bitmaps of frequency domain resources for a full-duplex mode each associated with one RBW in the BWP, wherein the UE monitors for the control transmission from the base station using the bitmaps associated with RBWs during one or more SBFD slots.

Aspect 27 is the apparatus of any of aspects 19-26, wherein the at least one processor coupled to the memory is further configured to: transmit an indication of the full-duplex mode for a SS set associated with the frequency domain resources for full-duplex operation, wherein the UE monitors for the control transmission from the base station using the one or more additional bitmaps based on the indication of the full-duplex mode for the SS set and the active RBW for monitoring occasions in SBFD slots.

Aspect 28 is the apparatus of any of aspects 19-27, wherein the at least one processor coupled to the memory is further configured to: transmit an indication of a half-duplex mode for a SS set associated with a bitmap of frequency domain resources in the CORESET configuration, wherein the UE monitors for the control transmission from the base station using the bitmap of frequency domain resources in a downlink slot based on the indication of the half-duplex mode for the SS set.

Aspect 29 is a method of wireless communication for implementing any of aspects 1 to 18.

Aspect 30 is an apparatus for wireless communication including means for implementing any of aspects 1 to 18.

Aspect 31 is a computer-readable medium storing computer executable code, where the code when executed by a processor causes the processor to implement any of aspects 1 to 18.

Aspect 32 is a method of wireless communication for implementing any of aspects 19 to 28.

Aspect 33 is an apparatus for wireless communication including means for implementing any of aspects 19 to 28.

Aspect 34 is a computer-readable medium storing computer executable code, where the code when executed by a processor causes the processor to implement any of aspects 19 to 28.

What is claimed is:

1. An apparatus for wireless communication at a user equipment (UE), comprising:
a memory; and
at least one processor coupled to the memory and configured to:
communicate with a base station operating in a sub-band frequency division duplexing (FDD) mode;
receive downlink transmissions within one or more resource bandwidths (RBWs) of an active bandwidth part (BWP);
receive a bitmap for frequency domain resources of a control resource set (CORESET) associated with the active BWP;
determine frequency resources for a monitoring occasion of the CORESET based on the bitmap and based on whether the monitoring occasion of the CORESET is in a sub-band full duplex (SBFD) slot or in a downlink slot; and
monitor for a control transmission within the downlink transmissions from the base station within the one or more RBWs of the active BWP.

2. The apparatus of claim 1, wherein the one or more RBWs correspond with usable bandwidth (BW) of the active BWP, the active BWP being in a sub-band full duplex (SBFD) slot, and wherein the usable BW does not include frequency resources used for guard band and uplink transmission.

3. The apparatus of claim 2, wherein the control transmission corresponds to one or more control resource sets (CORESETs) configured by the base station.

4. The apparatus of claim 3, wherein to monitor for the control transmission within the downlink transmissions from the base station within the one or more RBWs of the active BWP, the at least one processor coupled to the memory is further configured to:
monitor for the one or more CORESETs configured by the base station within the active BWP during monitoring occasions.

5. The apparatus of claim 4, wherein the at least one processor coupled to the memory is further configured to:
receive a configuration from the base station to monitor up to four CORESETs in the active BWP when the base station is operating under a half-duplex mode and the configuration to monitor additional CORESETs when the base station is operating under the FDD mode.

6. The apparatus of claim 5, wherein the at least one processor coupled to the memory is further configured to:
refrain from monitoring more than four CORESETs in a given slot.

7. The apparatus of claim 1, wherein the at least one processor coupled to the memory is further configured to:
receive a configuration of one or more control resource sets (CORESETs) for each of the one or more RBWs;
determine one or more monitoring occasions of the CORESET that fall partially or completely outside of an active RBW of the one or more RBWs; and
ignore the one or more monitoring occasions of the CORESET that fall partially or completely outside of the active RBW of the one or more RBWs.

8. The apparatus of claim 7, wherein the configuration comprises a bitmap of frequency domain resources that corresponds to resource blocks (RBs) in the RBW.

9. The apparatus of claim 7, wherein the UE receives search space configurations of one or more search space (SS) sets in a RBW and a SS set that defines monitoring occasions of a CORESET in the RBW.

10. The apparatus of claim 1, wherein to determine the frequency resources, the at least one processor coupled to the memory is further configured to:
determine, based on the bitmap, a first set of frequency resources within the active BWP for one or more monitoring occasions of the CORESET in one or more downlink slots; and
determine, based on the bitmap, a second set of frequency resources within an active RBW of the one or more RBWs in the active BWP for monitoring occasions of the CORESET in one or more SBFD slots.

11. The apparatus of claim 1, wherein the UE applies a subset of the bitmap to resource blocks in the active RBW of the one or more RBWs of the BWP for monitoring for the control transmission during the SBFD slot.

12. The apparatus of claim 1, wherein the at least one processor coupled to the memory is further configured to:
receive an indication of a half-duplex mode or a full-duplex mode in a search space (SS) set associated with the CORESET, wherein the UE monitors for the CORESET based on the indication by mapping the bitmap to resource blocks in the active BWP or a subset of the bitmap to resource blocks in the active RBW of the one or more RBWs in the BWP.

13. The apparatus of claim 12, wherein the UE maps the bitmap to a full BWP if the indication indicates the half-duplex mode for the SS set or maps a subset of the bitmap to an active RBW of the one or more RBWs in the BWP if the indication indicates the full-duplex mode.

14. The apparatus of claim 1, wherein the at least one processor coupled to the memory is further configured to:
receive a configuration for a control resource set (CORESET) associated with the active BWP including one bitmap of frequency domain resources for a half-duplex mode that is associated with the BWP and one or more additional bitmaps of frequency domain resources for a full-duplex mode each associated with one RBW in the BWP, wherein the UE monitors for the control transmission from the base station using the bitmaps associated with the one or more RBWs during one or more sub-band full duplex (SBFD) slots.

15. The apparatus of claim 14, wherein the at least one processor coupled to the memory is further configured to:
receive an indication of a full-duplex mode for a search space (SS) set associated with the frequency domain resources for full-duplex operation, wherein the UE monitors for the control transmission from the base station using the one or more additional bitmaps based on the indication of the full-duplex mode for the SS set and the active RBW for monitoring occasions in one or more sub-band full duplex (SBFD) slots.

16. The apparatus of claim 14, wherein the at least one processor coupled to the memory is further configured to:
receive an indication of a half-duplex mode for a search space (SS) set associated with the bitmap of frequency domain resources in the CORESET configuration, wherein the UE monitors for the control transmission within the downlink transmissions from the base station using the bitmap of frequency domain resources in a downlink slot based on the indication of the half-duplex mode for the SS set.

17. The apparatus of claim 1, further comprising a transceiver coupled to the at least one processor.

18. An apparatus for wireless communication at a base station (BS), comprising:
a memory; and
at least one processor coupled to the memory and configured to:
communicate with a user equipment (UE) while operating in a sub-band frequency division duplexing (FDD) mode;
transmit downlink transmissions within one or more resource bandwidths (RBWs) of an active bandwidth part (BWP);
transmit a bitmap for frequency domain resources of a control resource set (CORESET) associated with the active BWP;
wherein frequency resources for a monitoring occasion of the CORESET are determined based on the bitmap and based on whether the monitoring occasion of the CORESET is in a sub-band full duplex (SBFD) slot or in a downlink slot; and
configure the UE to monitor for a control transmission within the downlink transmissions from the base station within the one or more RBWs of the active BWP.

19. The apparatus of claim 18, wherein the one or more RBWs correspond with usable bandwidth (BW) of the active BWP, the active BWP being in a sub-band full duplex (SBFD) slot, and wherein the usable BW does not include frequency resources used for guard band and uplink transmission.

20. The apparatus of claim 18, wherein the at least one processor coupled to the memory is further configured to:
transmit a configuration of one or more control resource sets (CORESETs) for each of the one or more RBWs.

21. The apparatus of claim 20, wherein the configuration comprises a bitmap of frequency domain resources that corresponds to resource blocks (RBs) in a RBW.

22. The apparatus of claim 21, wherein the base station transmits a search space configuration of one or more search space (SS) sets in a RBW and a SS set that defines monitoring occasions of a CORESET in the RBW.

23. The apparatus of claim 20, wherein the at least one processor coupled to the memory is further configured to:
transmit an indication of a half-duplex mode for a search space (SS) set associated with a bitmap of frequency domain resources in the CORESET configuration, wherein the UE monitors for the control transmission from the base station using the bitmap of frequency domain resources in a downlink slot based on the indication of the half-duplex mode for the SS set.

24. The apparatus of claim 18, wherein the at least one processor coupled to the memory is further configured to:
transmit an indication of a half-duplex mode or a full-duplex mode in a search space (SS) set associated with the CORESET, wherein the UE monitors for the CORESET based on the indication by mapping the bitmap to resource blocks in the active BWP or a subset of the bitmap to resource blocks in the active RBW of the one or more RBWs in the BWP.

25. The apparatus of claim 18, wherein the at least one processor coupled to the memory is further configured to:
transmit a configuration for a control resource set (CORESET) associated with the active BWP including one bitmap of frequency domain resources for a half-duplex mode and one or more additional bitmaps of frequency domain resources for a full-duplex mode each associated with one RBW in the BWP, wherein the UE monitors for the control transmission from the base station using the bitmaps associated with RBWs during one or more SBFD slots.

26. The apparatus of claim 25, wherein the at least one processor coupled to the memory is further configured to:
transmit an indication of the full-duplex mode for a search space (SS) set associated with the frequency domain resources for full-duplex operation, wherein the UE monitors for the control transmission from the base station using the one or more additional bitmaps based on the indication of the full-duplex mode for the SS set and the active RBW for monitoring occasions in SBFD slots.

27. A method of wireless communication at a user equipment (UE), comprising:
communicating with a base station operating in a sub-band frequency division duplexing (FDD) mode;
receiving downlink transmissions within one or more resource bandwidths (RBWs) of an active bandwidth part (BWP);
receiving a bitmap for frequency domain resources of a control resource set (CORESET) associated with the active BWP;
determining frequency resources for a monitoring occasion of the CORESET based on the bitmap and based on whether the monitoring occasion of the CORESET is in a sub-band full duplex (SBFD) slot or in a downlink slot; and
monitoring for a control transmission within the downlink transmissions from the base station within the one or more RBWs of the active BWP.

28. A method of wireless communication at a base station, comprising:
communicating with a user equipment (UE) while operating in a sub-band frequency division duplexing (FDD) mode;
transmitting downlink transmissions within one or more resource bandwidths (RBWs) of an active bandwidth part (BWP);
transmitting a bitmap for frequency domain resources of a control resource set (CORESET) associated with the active BWP;
wherein frequency resources for a monitoring occasion of the CORESET are determined based on the bitmap and based on whether the monitoring occasion of the CORESET is in a sub-band full duplex (SBFD) slot or in a downlink slot; and configuring the UE to monitor for a control transmission within the downlink transmissions from the base station within the one or more RBWs of the active BWP.

* * * * *